(12) United States Patent
Carbonari

(10) Patent No.: US 7,145,961 B2
(45) Date of Patent: Dec. 5, 2006

(54) ULTRA WIDEBAND TRANSMITTER

(75) Inventor: David Carbonari, San Diego, CA (US)

(73) Assignee: Pulselink, Inc., Carlsbad, CA (US)

( * ) Notice: Subject to any disclaimer, the term of this patent is extended or adjusted under 35 U.S.C. 154(b) by 531 days.

(21) Appl. No.: 10/652,916

(22) Filed: Aug. 28, 2003

(65) Prior Publication Data

US 2005/0047480 A1    Mar. 3, 2005

(51) Int. Cl.
*H04L 27/04*    (2006.01)
(52) U.S. Cl. .................. 375/295; 375/130; 375/257; 375/267; 375/285; 370/210; 370/276; 370/352
(58) Field of Classification Search ............. 375/200, 375/202, 204, 219, 295, 349, 257, 267, 285, 375/130; 370/252, 219, 276, 352; 327/113; 342/13, 21, 27, 28, 89, 91, 93, 159, 375; 324/642; 455/46, 47, 91, 93, 103
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 4,641,317 A | 2/1987 | Fullerton | |
| 4,979,186 A | 12/1990 | Fullerton | |
| 5,146,616 A | 9/1992 | Tang et al. | |
| 5,363,108 A | 11/1994 | Fullerton | |
| 5,677,927 A | 10/1997 | Fullerton et al. | |
| 5,687,169 A | 11/1997 | Fullerton | |
| 5,748,891 A | 5/1998 | Fleming et al. | |
| 5,920,278 A | 7/1999 | Tyler et al. | |
| 6,002,708 A | 12/1999 | Fleming et al. | |
| 6,026,125 A * | 2/2000 | Larrick et al. | 375/295 |
| 6,031,862 A | 2/2000 | Fullerton et al. | |
| 6,178,217 B1 | 1/2001 | Defries et al. | |
| 6,275,544 B1 | 8/2001 | Aiello et al. | |
| 6,281,784 B1 | 8/2001 | Redgate et al. | |
| 6,426,716 B1 * | 7/2002 | McEwan | 342/28 |
| 6,505,032 B1 | 1/2003 | McCorkle et al. | |

(Continued)

FOREIGN PATENT DOCUMENTS

WO    WO 01/39451 A1    5/2001

(Continued)

OTHER PUBLICATIONS

I Wu, Predrag Spasojevic, Ivan Seskar, "Multipath Beamforming UWB Signal Design Based on Ternary Sequences", 40th Annual Allerton Conference, Aug. 26, 2002, WINLAB, Rutgers University, Camden, New Jersey, USA.

(Continued)

*Primary Examiner*—Mohammed Ghayour
*Assistant Examiner*—Edith Chang

(57) ABSTRACT

An ultra-wideband transmitter is provided. In one embodiment, the transmitter uses a monopulse of a continuous cyclic signal to phase shift a data pulse. The data pulses and the cyclic signal may be modulated by varying a phase of the data pulses and cyclic signal. The phase shifted data pulse may be used to generate an ultra-wideband pulse for transmission. The modulated data pulses and cyclic signal may be gated such that the data pulse and only a monopulse of the cyclic signal pass through the logic gate. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

4 Claims, 20 Drawing Sheets

U.S. PATENT DOCUMENTS

| | | | |
|---|---|---|---|
| 6,539,213 | B1 | 3/2003 | Richards et al. |
| 6,744,832 | B1* | 6/2004 | Miao .......................... 375/349 |
| 6,788,117 | B1* | 9/2004 | Roberts ...................... 327/113 |
| 2001/0033610 | A1 | 10/2001 | Chastain |
| 2002/0075972 | A1 | 6/2002 | Richards et al. |
| 2002/0076193 | A1 | 6/2002 | Melick et al. |
| 2003/0099204 | A1* | 5/2003 | Subrahmanyan et al. ... 370/252 |

FOREIGN PATENT DOCUMENTS

| | | |
|---|---|---|
| WO | WO 01/93434 A2 | 12/2001 |
| WO | WO 02/31986 A2 | 4/2002 |

OTHER PUBLICATIONS

Henning F. Harmuth, "Applications of Walsh functions in communications", IEEE Spectrum, Nov. 1969, pp. 82-91, USA.

Robert Fleming, Cherie Kusher, "Integrated, Low-Power, Ultra-Wideband Transceivers for Distributed Position Location and Communication", Semi-Annual Technial Report Contract J-BFI-94-058, Aether Wire & Location, Inc. Jul. 1995, Nicasio, CA, USA.

Robert Fleming, Cherie Kusher, "Low-Power, Miniature, Distributed Position Location and Communication Devices Using Ultra-Wideband, Noninusoidal Communication Technology", Semi-Annual Technical Report Contract J-BFI-94-058, Aether Wire & Location, Inc. Jul. 1995, Nicasio, CA, USA.

Fernando Ramirez-Mireles, Robert A. Scholtz, "N-Orthogonal Time-Shift-Modulated Codes for Impulse Radio", Report from Joint Services Electronics Program Contract F 49620-94-0022, CTMC 1997, IEEE Wireless 98, Jul. 1998, USA.

Fernando Ramirez-Mirales, "On Performance of Ultra Wideband Signals in Gaussian Noise Dense Mutlipath", Paper 99C265, Accepted for Publication in the IEEE Transactions on Vehicular Technology, USC Ultralab, USA.

Robert A. Scholtz, P. Vijay Kumar, Carlos J. Corrada-Bravo, "Signal Design for Ultra-wideband Radio", Department of Electrical Engineers, University of Southern California, Los Angeles, CA, USA.

Moe Z. Win, Zoran A. Kostic, "Impact of Spreading Bandwidth on Rake Reception in Dense Multipath Channels", IEEE Journal on Selected Areas on Communications, vol. 17, No. 10, pp. 1794-1806, Oct. 1999, USA.

Moe Z. Win, George Chrisikos, Nelson R. Sollenberger, "Performance of Rake Reception in Dense multipath Channels: Implications of Spreading Bandwidth and Selection Diversity Order", IEEE Journal on Selected Areas on Communications, vol. 18, No. 8, pp. 1516-1525, Aug. 2000, USA.

Henning F. Harmuth, "Frequency-Sharing and Spread-Spectrum Transmission with Large Relative Bandwidth", IEEE Transactions on Electromagnetic Compatibility, vol. EMC-20, No. 1, Feb. 1978, USA.

Multispectral Solutions, Inc., "Revision of Part 15 of the Commission's Rules Regarding Ultra-Wideband Transmission Systems" Sep. 12, 2000.

Anna Scaglione, "Differential Direct Sequence Spread Spectrum for Ultra-Wideband Low power Wireless Microsystems", University of New Mexico, Dept. of EECE, Albuquerque, NM, USA.

* cited by examiner

ULTRA WIDEBAND TRANSMITTER

FIELD OF THE INVENTION

The present invention relates to ultra-wideband communications. More particularly, the invention concerns an ultra-wideband transmitter.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as movies-on-demand and video teleconferencing demand high data transmission rates. Another example is interactive video in homes and offices. Moreover, traffic across the Internet continues to increase, and with the introduction of new applications, such as the convergence of voice and Internet data, traffic will only increase at a faster rate. Consequently, carriers and service providers are overhauling the entire network infrastructure—including switches, routers, backbone, and the last mile (i.e., the local loop)—in an effort to provide more bandwidth.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. The need for more bandwidth is evidenced by user complaints of slow Internet access and dropped data links that are symptomatic of network overload.

Many industries use radio frequency technology to transmit data. Conventional radio frequency technology employs continuous sine waves that are transmitted with data embedded in a modulation of the sine waves' amplitude or frequency. For example, a conventional cellular phone must operate at a particular frequency band of a particular width in a prescribed frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Therefore, there exists a need for an apparatus and method to increase the bandwidth of wire and wireless networks.

SUMMARY OF THE INVENTION

The present invention provides a transmitter system for ultra-wideband (UWB) communications. The transmitter system may be used in conjunction with any communication medium.

One embodiment of the present invention provides a transmitter system that increases the available bandwidth of a communication system by enabling the simultaneous transmission of conventional carrier-wave signals and ultra-wideband pulses. The transmitter system of the present invention enables the simultaneous coexistence of the ultra-wideband pulses with conventional carrier-wave signals. The present invention may be used in wireless and wire communication networks such as hybrid fiber-coax networks.

In one embodiment of the present invention, the transmitter system includes a data modulation unit, a transmitter unit, and an antenna. One feature of the present invention is that the transmitted ultra-wideband pulses have a spectral power density that does not cause interference with other communication signals. Thus, the ultra-wideband pulses transmitted according with the present invention enable a significant increase in the bandwidth, or data rates of a communication system.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
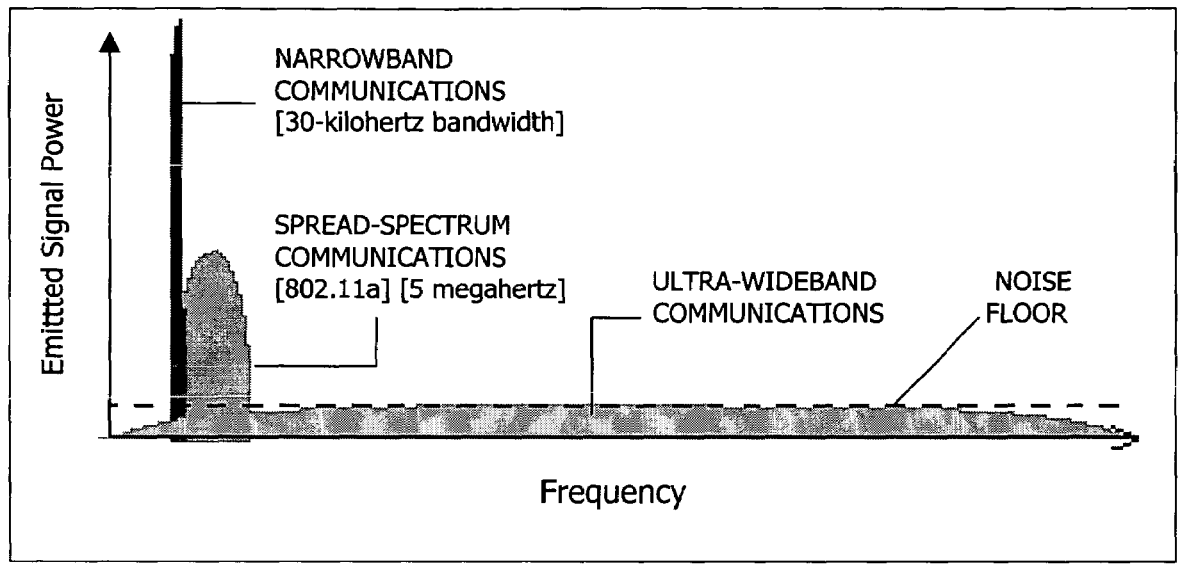
FIG. 1 is an illustration of different communication methods.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the present invention throughout this document does not mean that all claimed embodiments or methods must include the referenced feature(s).

The present invention provides a method of transmitting an ultra-wideband signal. In a preferred embodiment, the present invention comprises an ultra-wideband transmitter that phase shifts a continuous cyclic signal to a specific center frequency.

The pulse can be transmitted and received wirelessly, or through any wire medium, whether the medium is twisted-pair wire, coaxial cable, fiber optic cable, or other types of wire media.

One embodiment of the present invention provides a transmitter system that increases the available bandwidth of a communication system by enabling the simultaneous transmission of conventional carrier-wave signals and ultra-wideband pulses. The present invention may be used in wireless and wire communication networks such as hybrid fiber-coax networks.

In one embodiment of the present invention, data is transformed so that it will always include a zero in every pair of transmitted data bits. Zeros in the modulation technique of the present invention are represented by the absence of electromagnetic energy. Therefore, by ensuring a zero in every pair of transmitted data bits, the average energy transmitted into the radio frequency spectrum is reduced. This reduces the possibility of interfering with other signals, and alternatively, in another embodiment of the present invention, may allow the power of each ultra-wideband pulse to be increased.

One feature of the present invention is that the transmitted ultra-wideband pulses can have a spectral power density that does not cause interference with other communication signals. Thus, the ultra-wideband pulses transmitted according to the methods of the present invention enable an increase in the bandwidth, or data rates of a communication system.

The present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may use wires or they may be wireless. A network as defined herein can interconnect with other networks and contain sub-networks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology used by the network, such as, for example, a Transmission Control Protocol/Internet Protocol (TCP/IP) network, a Systems Network Architecture network, among others. A network as defined herein can also be characterized by whether it carries voice, data, or both kinds of signals. A network as defined herein may also be characterized by users of the network, such as, for example, users of a public switched telephone network (PSTN) or other type of public network, and private networks (such as within a single room or home), among others. A network as defined herein can also be characterized by the usual nature of its connections, for example, a dial-up network, a switched network, a dedicated network, and a non-switched network, among others. A network as defined herein can also be characterized by the types of physical links that it employs, for example, optical fiber, coaxial cable, a mix of both, unshielded twisted pair, and shielded twisted pair, among others.

The present invention may also be employed in any type of wireless network, such as a wireless PAN, LAN, MAN, or WAN. The present invention dramatically increases the bandwidth of conventional networks that employ wire media, but can be inexpensively deployed without extensive modification to the existing wire media network.

The present invention provides increased bandwidth by injecting, or otherwise super-imposing an ultra-wideband (UWB) signal into an existing data signal and subsequently recovers the UWB signal at an end node, set-top box, subscriber gateway, or other signal receiving device.

Figure 2:
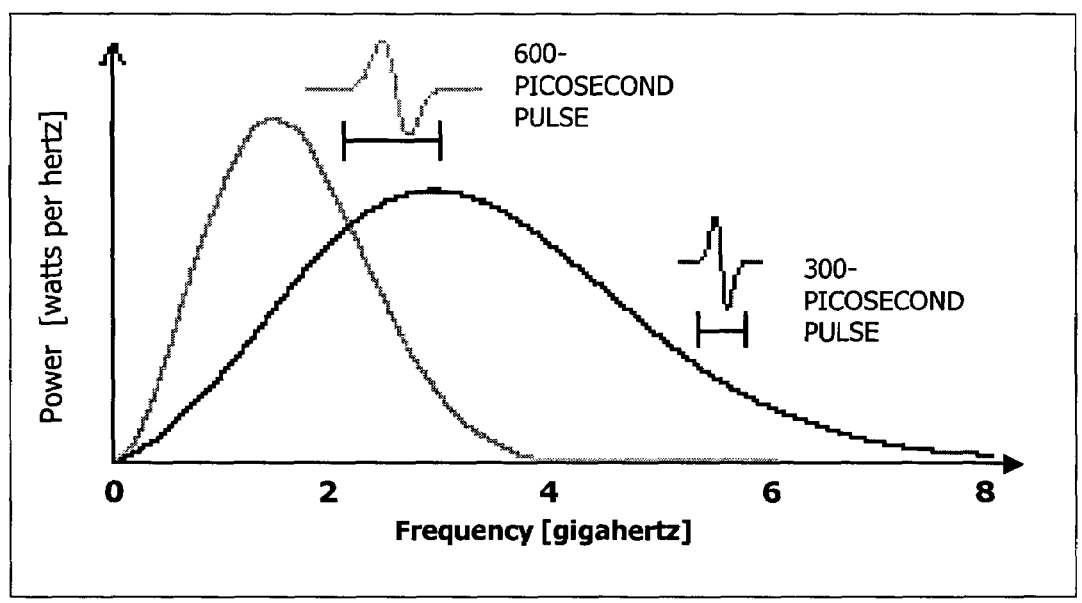
FIG. 2 is an illustration of two ultra-wideband pulses.

Referring to FIGS. 1 and 2, ultra-wideband (UWB) employs pulses of electromagnetic energy that are emitted at, for example, nanosecond or picosecond intervals (generally tens of picoseconds to a few nanoseconds in duration). For this reason, ultra-wideband is often called "impulse radio." That is, the UWB pulses are transmitted without modulation onto a sine wave carrier frequency, in contrast with conventional radio frequency technology as described above. Alternate implementations of UWB can be achieved by mixing baseband pulses with a carrier wave that controls a center frequency of a resulting UWB signal. Ultra-wideband generally requires neither an assigned frequency nor a power amplifier.

An example of a conventional radio frequency technology is illustrated in FIG. 1. IEEE 802.11a, a wireless local area network (LAN) protocol, transmits radio frequency signals at a 5 GHz center frequency, with a radio frequency spread of about 5 MHz. A UWB pulse may have a 2.0 GHz center frequency, with a frequency spread of approximately 4 GHz, as shown in FIG. 2, which illustrates two typical UWB pulses. FIG. 2 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 1. Because UWB pulses are spread across an extremely wide frequency range, UWB communication systems allow communications at very high data rates, such as 100 megabits per second or greater. According to one embodiment of the invention, the transmitter may be configured to transmit both carrier-wave signals and UWB signals. The carrier-wave signals and the UWB signals may be transmitted substantially simultaneously. The transmitter may include a carrier-wave transmitter portion that enables carrier-wave signals to be transmitted. A single antenna may be used for transmitting both the carrier-wave signals and the UWB signals.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by reference.

Also, because the UWB pulse is spread across an extremely wide frequency range, the power sampled at a single, or specific frequency is very low. For example, a UWB one-watt pulse of one nano-second duration spreads the one-watt over the entire frequency occupied by the pulse. At any single frequency, such as at the carrier frequency of a cable television (CATV) provider, the UWB pulse power present is one nano-watt (for a frequency band of 1 GHz). This is calculated by dividing the power of the pulse (i.e., 1 watt) by the frequency band (i.e., 1 billion Hertz). This is well within the noise floor of any wire media system and therefore does not interfere with the demodulation and recovery of signals transmitted by the CATV provider. Generally, a multiplicity of UWB pulses are transmitted at relatively low power (when sampled at a single, or specific frequency), for example, at less than −30 power decibels to −60 power decibels, which reduces interference with conventional radio frequencies. UWB pulses, however, transmitted through many wire media will not interfere with wireless radio frequency transmissions. Therefore, the power (sampled at a single frequency) of UWB pulses transmitted though wire media may range from about +30 dBm to about −140 dBm.

Figure 3:
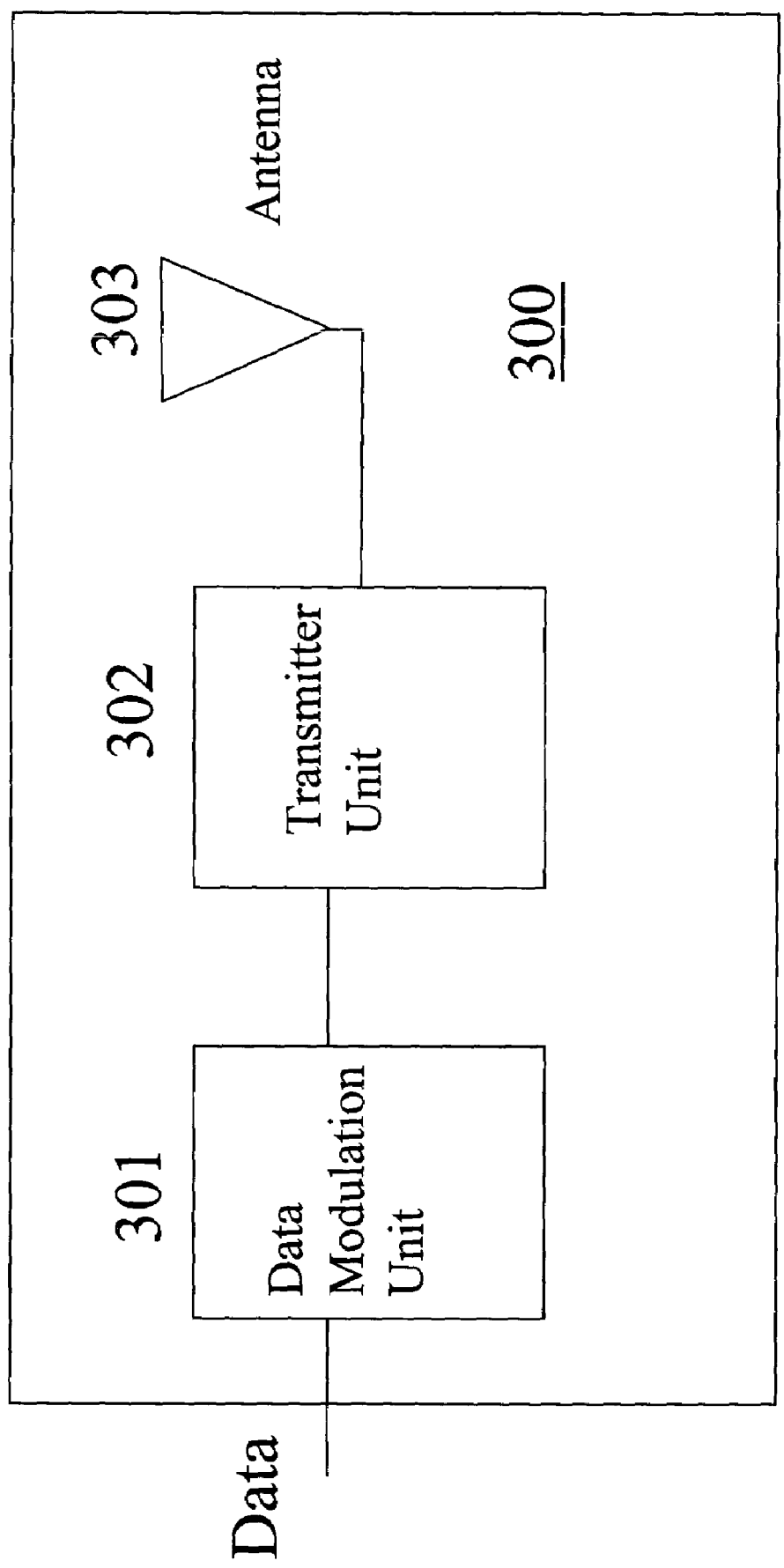
FIG. 3 is an illustration of an ultra-wideband transmitter system according to one embodiment of the present invention.

FIG. 3 illustrates an ultra-wideband transmitter system 300 according to one embodiment of the present invention. Data to be transmitted enters a data modulation unit 301. One or more data modulation techniques may be applied to the data. Examples of the data modulation techniques include multi-level PPM, multi-level PAM, and multi-level PSK. The modulated data is sent to a transmitter unit 302 where ultra-wideband (UWB) pulse generation and potentially further modulation occurs. The UWB pulse generation for the data typically results in a plurality of UWB pulses being generated. The plurality of UWB pulses generated by the transmitter unit 302 may then be applied to an antenna 303 for radiation.

Figure 4:
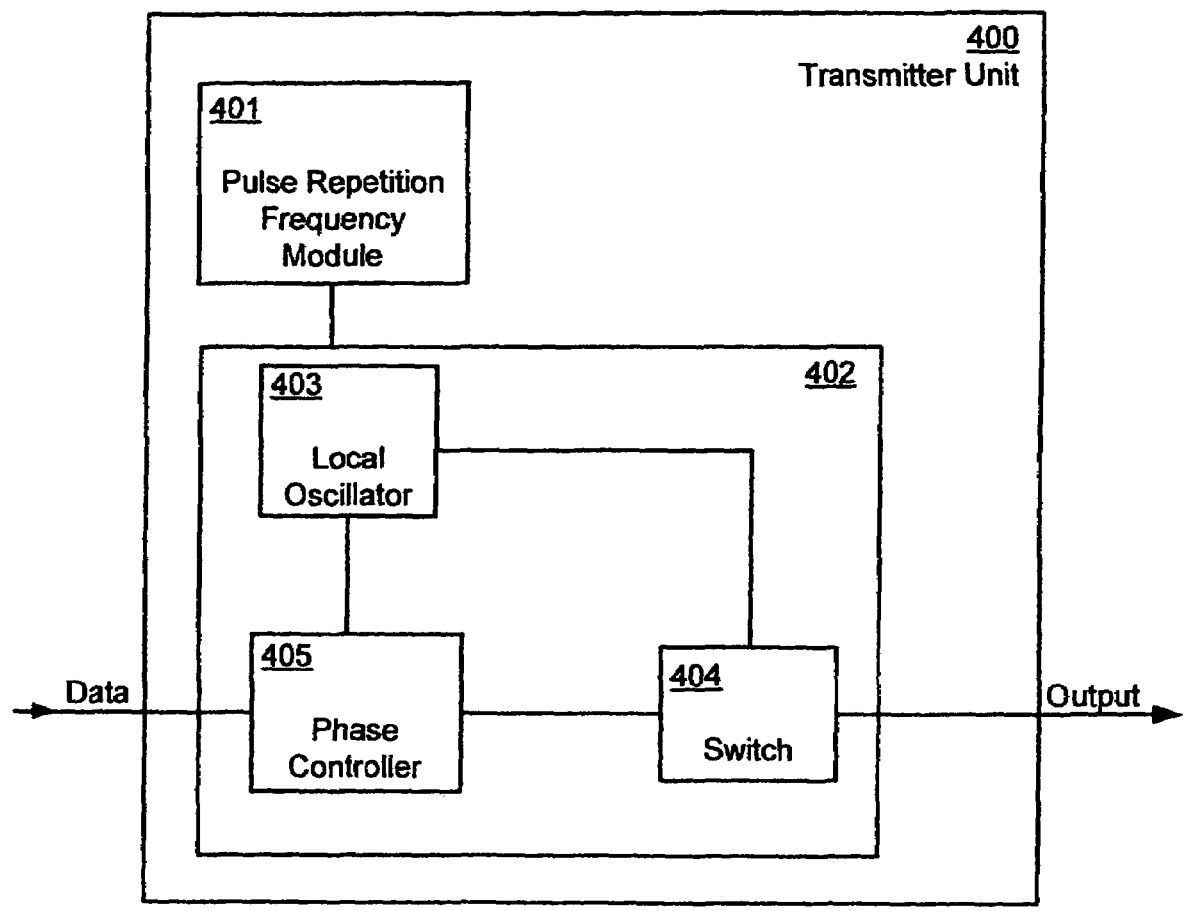
FIG. 4 is an illustration of the transmitter unit according to one embodiment of the present invention.

FIG. 4 illustrates a transmitter unit 400 according to one embodiment of the present invention. The transmitter unit 400 may further comprise a UWB pulse repetition frequency module 101. The UWB pulse repetition frequency module 401 may control the frequency at which the plurality of UWB pulses are generated by a pulse generation module 402. When the plurality of UWB pulses are transmitted at a fixed pulse repetition frequency (PRF), a resulting spectrum may have significant spectral lines at the PRF and its integer harmonics. If spectral lines at the integer harmonics are not desired, a pseudo-random PRF may be employed.

According to one embodiment of the invention, the transmitter 400 may also include a local oscillator 403 that is configured to output a waveform. A switch 404 may be operatively coupled to the local oscillator 403. The switch 404 may be used to gate the waveform. The switch may comprise, for example, an AND gate that performs an AND function that gates the waveform Alternatively, other logic gates may be employed, such as an OR gate or an a NOT gate. A phase controller 405 may be used to control a phase of the waveform. It will be appreciated that other components, arrangements and configurations may be used that are within the scope of the present invention.

Figure 5:
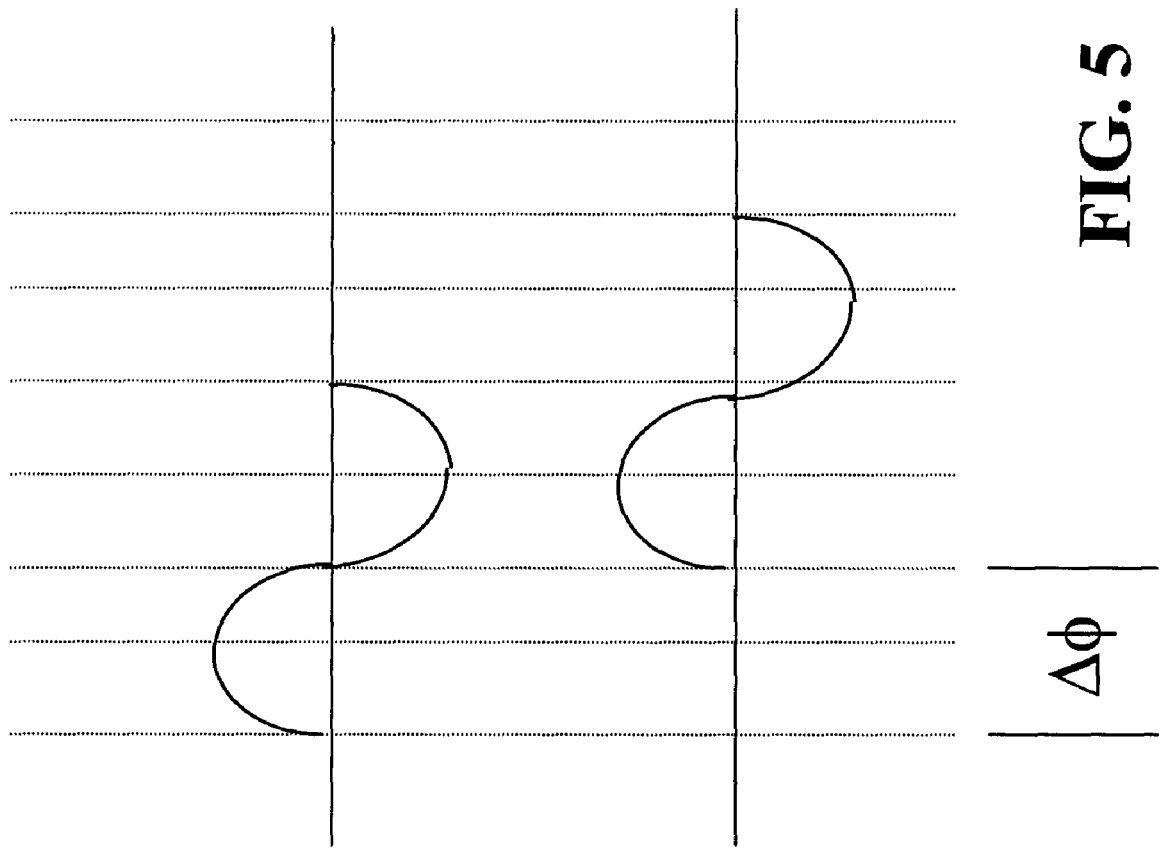
FIG. 5 shows two ultra-wideband pulses 180 degrees out of phase according to one embodiment of the present invention.

FIG. 5 illustrates two UWB pulses according to one embodiment of the present invention. These pulses are depicted as monocycles 501, 502 of a sine wave with different phases. One pulse is represented the positive phase monocycle 501 and the second pulse is represented by the negative phase monocycle 502 of a unique data group produced by ternary encoding. The monocycles 501, 502 have a phase relationship of $\Delta\phi$. The monocycles 501, 502 are separated by approximately 180°. That is, the monocycles have a phase relationship of $\Delta\phi$ of approximately 180°.

Figure 6:
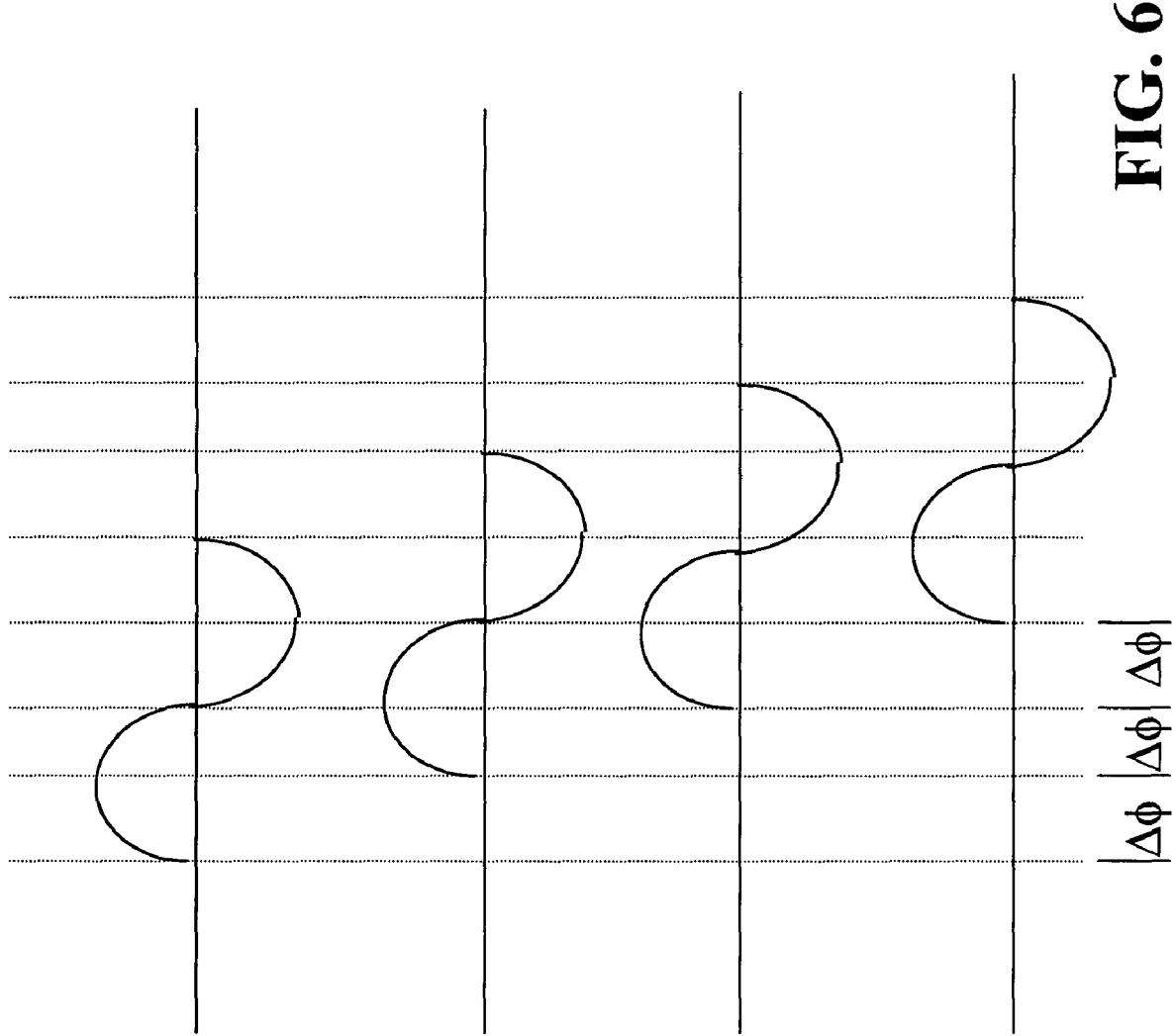
FIG. 6 shows four ultra-wideband pulses 90 degrees out of phase according to one embodiment of the present invention.

FIG. 6 illustrates four UWB pulses according to one embodiment of the present invention. The pulses are depicted as monocycles 601–604 of a sine wave with different phases. The monocycles 601–604 have a phase relationship $\Delta\phi$ of 90°. The monocycles 601–604 are the result of additional PSK modulation of unique data groups produced by ternary encoding. In the data groups, each monocycle 601–604 may be followed or preceded by an absence of intentional energy. For example, ternary encoding may produce four unique data groups: 0, 1; 0, −1; 1, 0, and −1, 0. Further PSK encoding may replace the intentional energy present in the 1 or −1 with one of the four monocycles 601–604.

Figure 7:
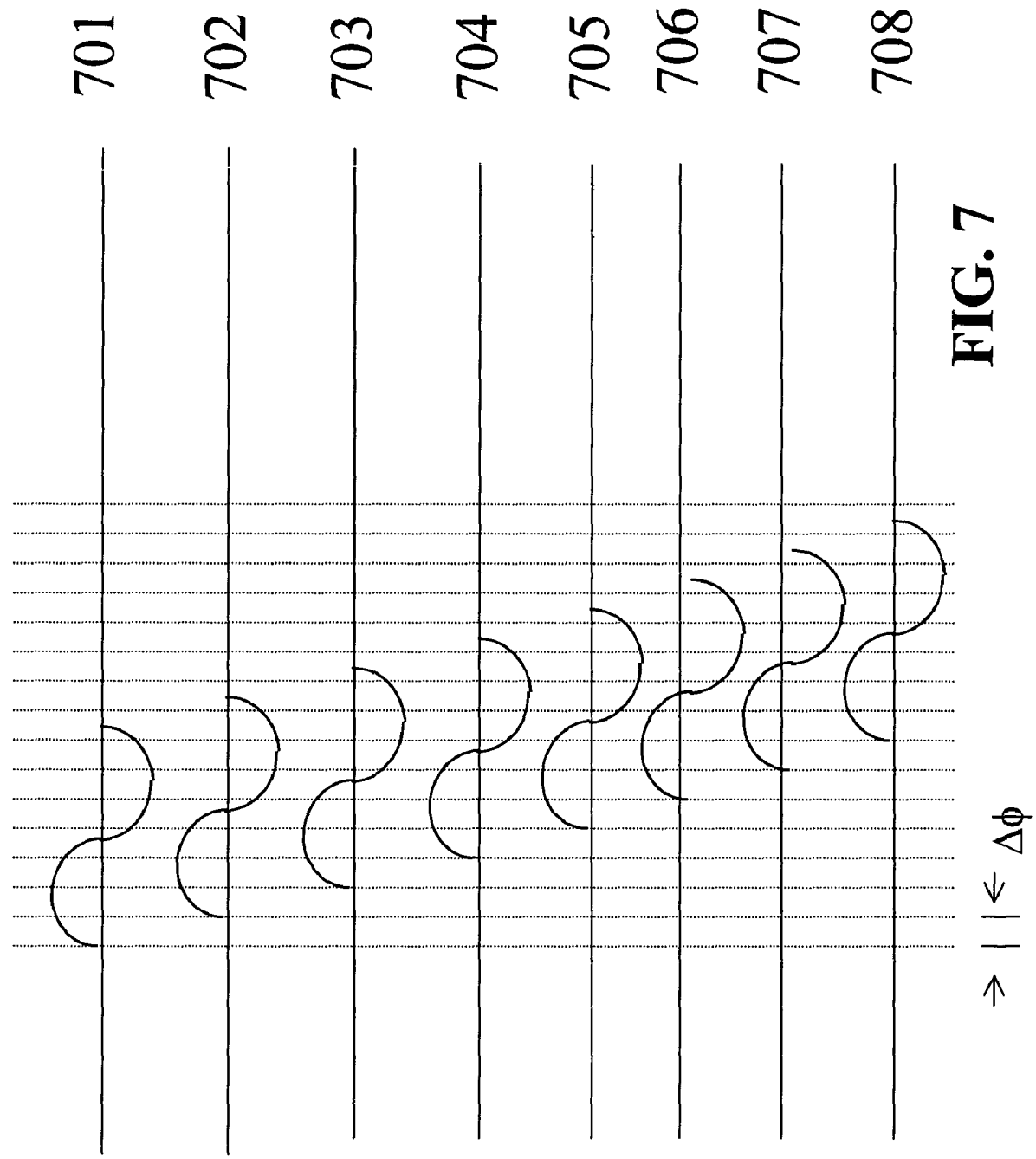
FIG. 7 shows eight ultra-wideband pulses in 45-degree phase increments according to one embodiment of the present invention.

FIG. 7 illustrates eight UWB pulses according to one embodiment of the present invention. The pulses are depicted as monocycles 701–708 that have a phase relationship $\Delta\phi$ of 45°. As described above with reference to FIG. 6, the monocycles 701–708 show further PSK modulation of ternary encoding and may likewise be preceded or followed by an absence of intentional energy. The intentional energy present in the 1 or −1 of ternary encoding may be replaced by one of the monocycles 701–708.

Figure 8:
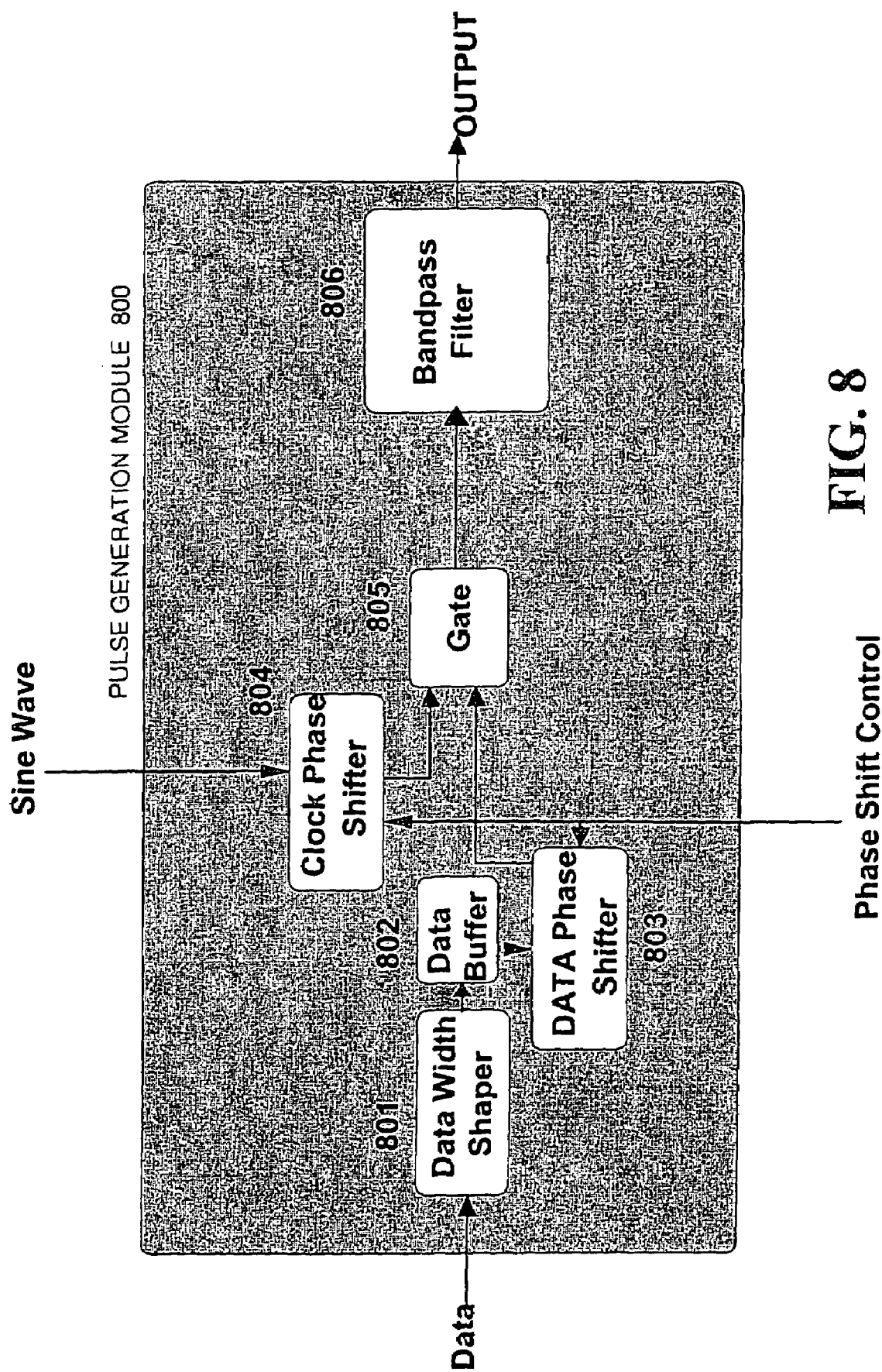
FIG. 8 illustrates a single channel ultra-wideband pulse generation module according to one embodiment of the present invention.

FIG. 8 illustrates a single channel ultra-wideband (UWB) pulse generation module 800 according to one embodiment of the present invention. One or more data pulses enters the UWB pulse generation module 800 through a data width shaper 801. The data width shaper 801 controls the width of the data pulses to match one-half of a cycle of an input sine wave described in further detail below. A resulting shaped data pulse is sent to an optional data buffer 802. The shaped data pulse is then sent to a data phase shifter 803.

A locally generated sine wave enters a clock phase shifter 804. The sine wave may be generated by, for example, a local oscillator, or other suitable components. The local oscillator may be operatively coupled to the local oscillator for gating the sine wave. A phase shift control signal controls the amount that a data signal and a clock signal are shifted in the data phase shifter 803, and in the clock phase shifter 804. In this embodiment, data phase shifter 803 and clock phase shifter 804 are controllable by the phase shift control that may be used to allow both shifted and non-shifted signals to be generated.

The shifted data and shifted clock signals are then sent to a gate 805. The gate 805 operates to permit a one-half cycle of the clock signal (known as a monopulse) to pass through the gate 805. A leading edge of the data signal activates the gate 805 to the monopulse to pass through the gate 805. The monopulse is then shaped by, preferably, a bandpass filter 806 into a monocycle. A resulting signal output by the bandpass filter 806 is a monocycle with a desired phase controlled by the phase shift control signal.

Figure 9:
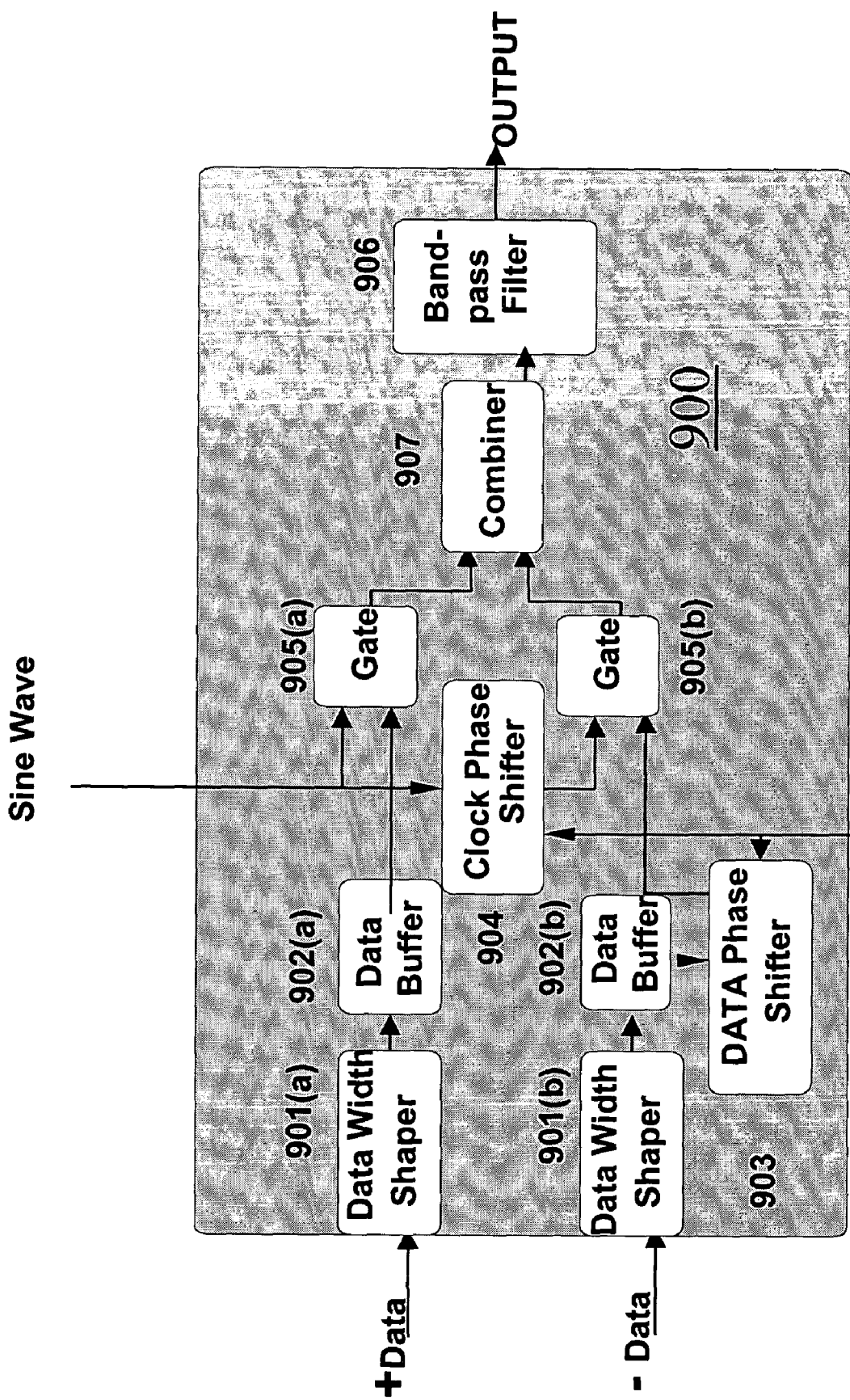
FIG. 9 illustrates a dual channel ultra-wideband pulse generation module according to one embodiment of the present invention.

FIG. 9 illustrates a two-channel pulse generation unit 900 according to one embodiment of the present invention. In this embodiment, positive and negative polarity data, in the form of data pulses, from ternary encoding is input into data width shapers 901(*a*) and 901(*b*), respectively. The positive and negative data pulses are sent using +data and −data channels. The data width shapers 901(*a*) and 901(*b*) control the width of the data pulses to correspond with one cycle of a sine wave. The shaped data pulses are then sent to optional data buffers 902(*a*) and 902(*b*), respectively. Because positive phase data is not shifted, the +data channel is sent to a gate 905(*a*) and enables a one-half cycle of a sine wave to pass through the gate 905(*a*). Because the −data channel is represented by a phase-shifted monocycle, its shaped data pulse is sent to a data phase shifter 902(*b*).

A sine wave, such as a master clock, is likewise sent to a clock phase shifter 904. The clock phase shifter may shift the sine wave by a predetermined amount. The sine wave may be generated by, for example, a local oscillator. The local oscillator may be operatively coupled to the local oscillator for gating the sine wave. The data phase shifter 902(*b*) and clock phase shifter 904 may be externally controllable by a phase shift control signal or have a fixed phase delay. The shifted sine wave and data pulse are then input to gate 905(*b*). A leading edge of the data signal turns on the gate 905(*b*) and allows a one-half cycle of the sine wave (monopulse) to pass the gate 905(*b*) as described above. A trailing edge of the data pulse turns off gate 905(*b*) ensuring that only a one-half cycle of the sine wave passes gate 905(*b*). A monopulse signal passes through the gate 905(*a*) in a similar manner.

The monopulse signals leaving the gates 905(*a*) and 905(*b*) are then sent to a combiner 907. Because ternary encoding ensures that in unique data groups there is always one zero, there will either be a positive data signal or a negative data signal. Both signals may not be present simultaneously. A signal output by the combiner 907 may therefore represent positive data with a non-shifted monopulse or negative data with a shifted monopulse. The output of the combiner 907 may then be shaped into a monocycle by a bandpass filter 906.

Figure 10:
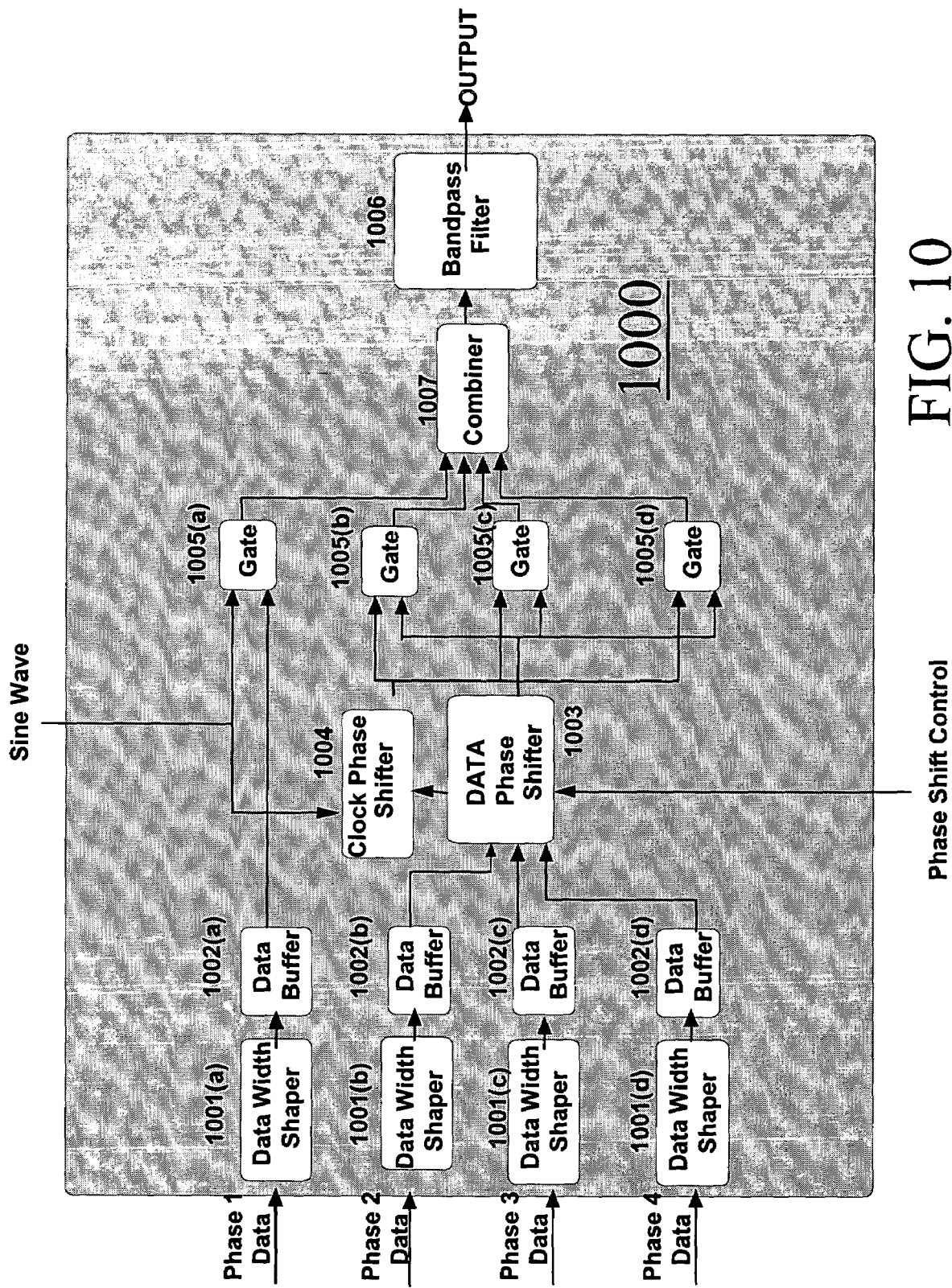
FIG. 10 illustrates a four-channel ultra-wideband pulse generation module according to one embodiment of the present invention.

FIG. 10 illustrates a four-channel pulse generation unit 1000 according to one embodiment of the present invention. In this embodiment, ternary encoded data has been modulated to include additional phases. An output signal may be preceded or followed by an absence of intentional energy that completes a unique data group.

Phase 1 through 4 data enters data width shapers 1001(*a*)–(*d*), respectively, as data pulses from phase 1–4 data channels. The width of the data pulses are controlled to match a one-half cycle of a sine wave by data width shapers 1001(*a*)–(*d*). The data pulses are then sent to optional data buffers 1002(*a*)–(*d*), respectively. Because one of the data pulses may be represented by an un-shifted signal, the phase 1 channel is sent to a switch, such as gate 1005(*a*).

A sine wave, such as the master clock, is sent to the gate 1005(*a*). The sine wave may be generated by, for example, a local oscillator. The rising edge of the phase 1 data enables the sine wave to pass through the gate 1005(*a*). The trailing edge of phase 1 data turns off the gate 1005(*a*) ensuring that only a one-half cycle of the sine wave passes through the gate 1005(*a*). Because phase 2 through 4 data is represented by further phase shifts, signals leaving optional data buffers 1002(*b*)–(*d*) are sent to a data phase shifter 1003. If fixed phase delay elements are used, three data phase shifters may replace the data phase shifter 1003, (i.e., one for each data channel).

The sine wave is sent to a clock phase shifter 1004. In the embodiment where a fixed phase shift elements are used for clock phase shifter 1004, it would likewise be replicated for the other data channels, each element having a fixed phase delay element to match the element in its corresponding data phase shifter. Alternatively, when controllable phase shift elements are used for the data phase shifter 1003 and the clock phase shifter 1004, a phase shift control signal is used to control the shift. The shifted clock signals and the shifted data signals are then sent to gates 1005(*b*)–(*d*). The shifted data signals control the gates 1005(*b*)–(*d*) to allow a one-half cycle of the shifted clock signal (monopulses) to pass through the gates 1005(*a*)–(*d*) as described above. The monopulses created by the gates 1005(*a*)–(*d*) are then sent to a combiner 1007. Because the phase data signals are the result of further PSK modulation on the unique data groups created by ternary encoding, energy may be provided on one of the four channels. The combiner 1007 sends the monopulse received from one of the gates 1005(*a*)–(*d*) to a bandpass filter 1006. Bandpass filter 1006 shapes the monopulse into a monocycle with a desired phase delay.

Figure 11:
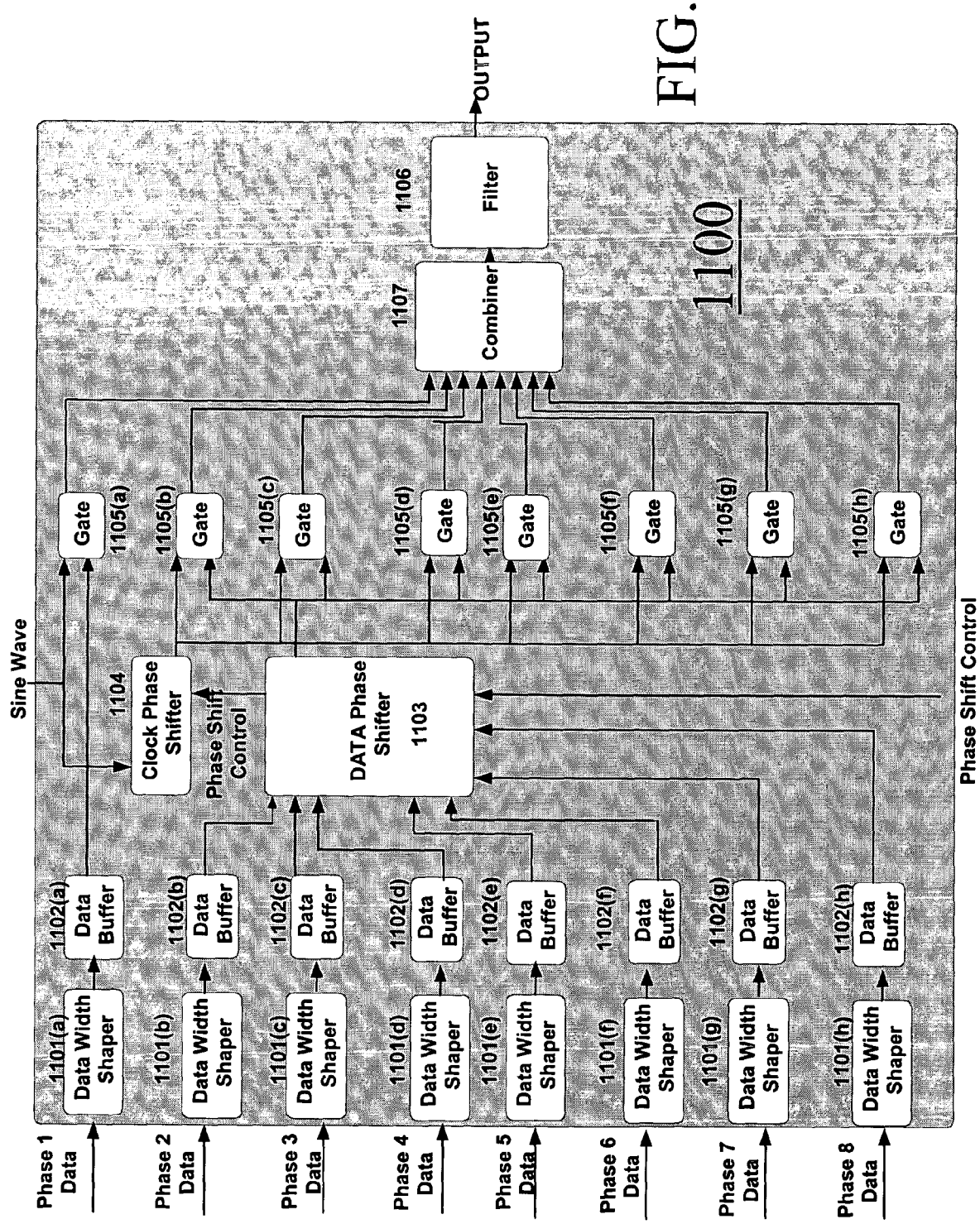
FIG. 11 illustrates an eight-channel ultra-wideband pulse generation module according to one embodiment of the present invention.

FIG. 11 illustrates an eight-channel pulse generation module 1100 according to one embodiment of the present invention. In this embodiment, ternary encoded data has been further modulated to include additional phases. An output signal may be preceded or followed by an absence of intentional energy that completes a unique data group.

Phase 1 through 8 data enters data width shapers 1101(*a*)–(*h*), respectively, as data pulses from data channels. The width of the data pulses for phase 1 through 8 data are controlled to match a one-half cycle of a sine wave by data width shapers 1101(*a*)–(*h*), respectively. The signals are then sent to optional data buffers 1102(*a*)–(*h*), respectively. Because one of the data signals can be represented by an un-shifted signal, the phase 1 channel is sent to a switch, such as gate 1105(*a*).

Figure 12:
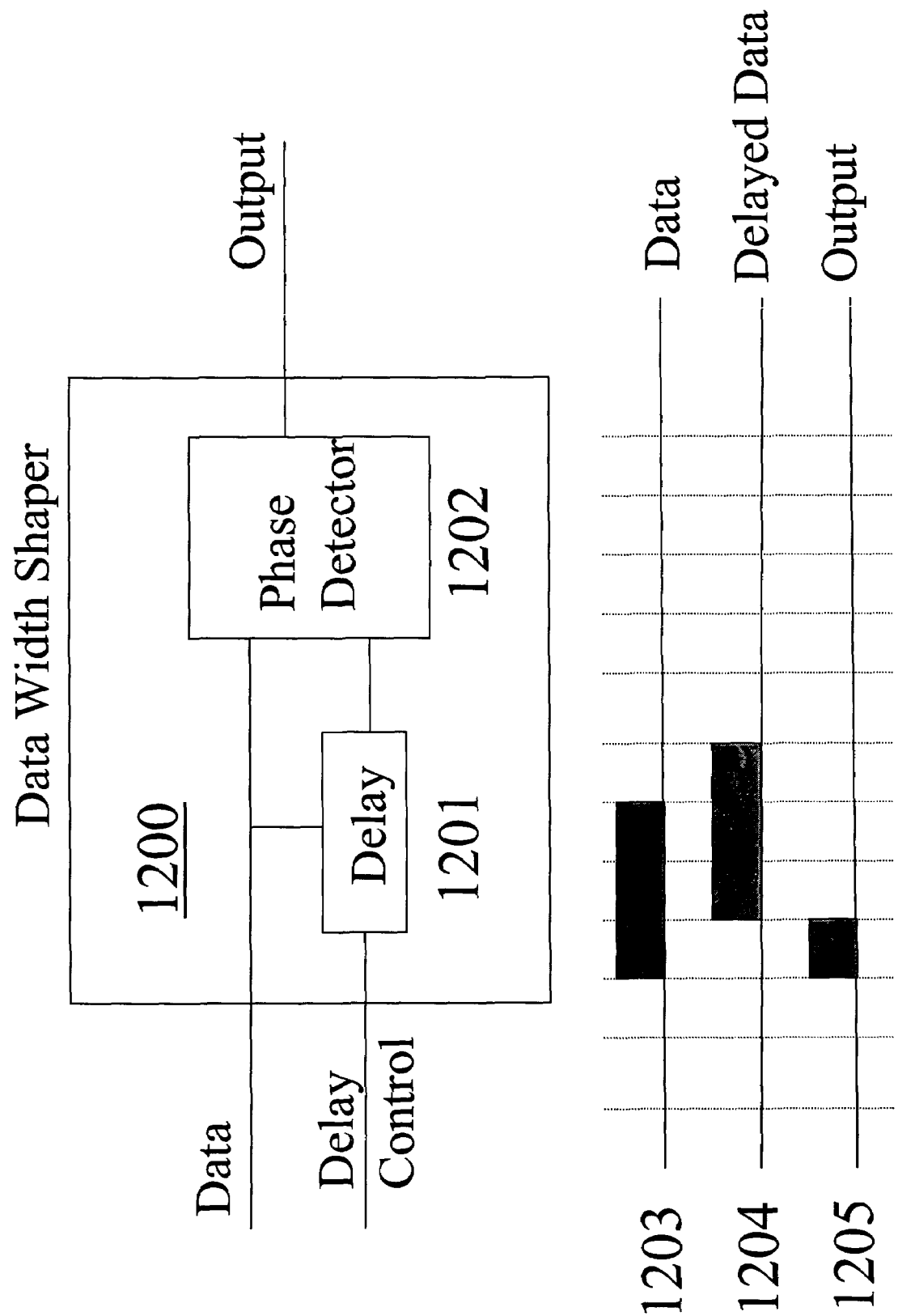
FIG. 12 illustrates the data width shaper according to one embodiment of the present invention.

A sine wave is sent to the gate 1105(*a*). The sine wave may be generated by, for example, a local oscillator that operates as a master clock, or other suitable components may be employed to generate a sine wave. The rising edge of phase 1 data enables the sine wave to pass through the gate 1105(*a*). The trailing edge of phase 1 data turns off the gate 1105(*a*) ensuring that only a one-half cycle of the sine wave (a monopulse) passes through the gate 1105(*a*). Because phase 2 through 8 data is represented by further phase shifts, signals leaving optional data buffers 1102(*b*)–(*h*) are sent to a data phase shifter 1103. If fixed phase delay elements are used, seven data phase shifters may replace the data phase shifter 1103 (i.e., one for each data channel). The sine wave is sent to a clock phase shifter 1104. In the embodiment where fixed phase shift elements are used for the clock phase shifter 1104, it would likewise be replicated for the other data channels, each element having a fixed phase delay element to match the element in its corresponding data phase shifter. Alternatively, when controllable phase shift elements are used for the data phase shifter 1103 and the clock phase shifter 1104, a phase shift control signal is used to control the shift. The shifted clock signals and the shifted data signals are then sent to gates 1105(*b*)–(*h*). The shifted data signals control the gates 1105(*b*)–(*h*) to allow monopulses of the shifted clock signal to pass through the gates 1105(*a*)–(*h*) as described above. The monopulses created by the gates 1105(*a*)–(*h*) are then sent to a combiner 1107. Because the phase data signals result from further PSK modulation on the unique data groups created by ternary encoding, energy may be provided on one of the eight channels. The combiner 1107 sends the monopulse received from one of the gates 1105(*a*)–(*h*) to a filter 1106. The filter 1106 shapes the monopulse into a monocycle with an appropriate phase delay. FIG. 12 illustrates a data width shaper 1200 according to one embodiment of the present invention. A data signal enters a delay 1201 and a phase detector 1202. The delay 1201 is configured to give a precise delay equal to a one-half cycle of a sine wave as described above. In one embodiment, the delay 1201 is a fixed delay. Alternatively, the delay 1201 may have a controllable delay. In another embodiment, also shown in FIG. 12, a delay control signal may be used to control the delay period that the delay 1201 imparts to the data signal. The phase detector 1202 measures a difference between a data signal 1203 and a delayed data signal 1204 and outputs an output signal 1205 of a duration equal to the difference in phase.

Figure 13:
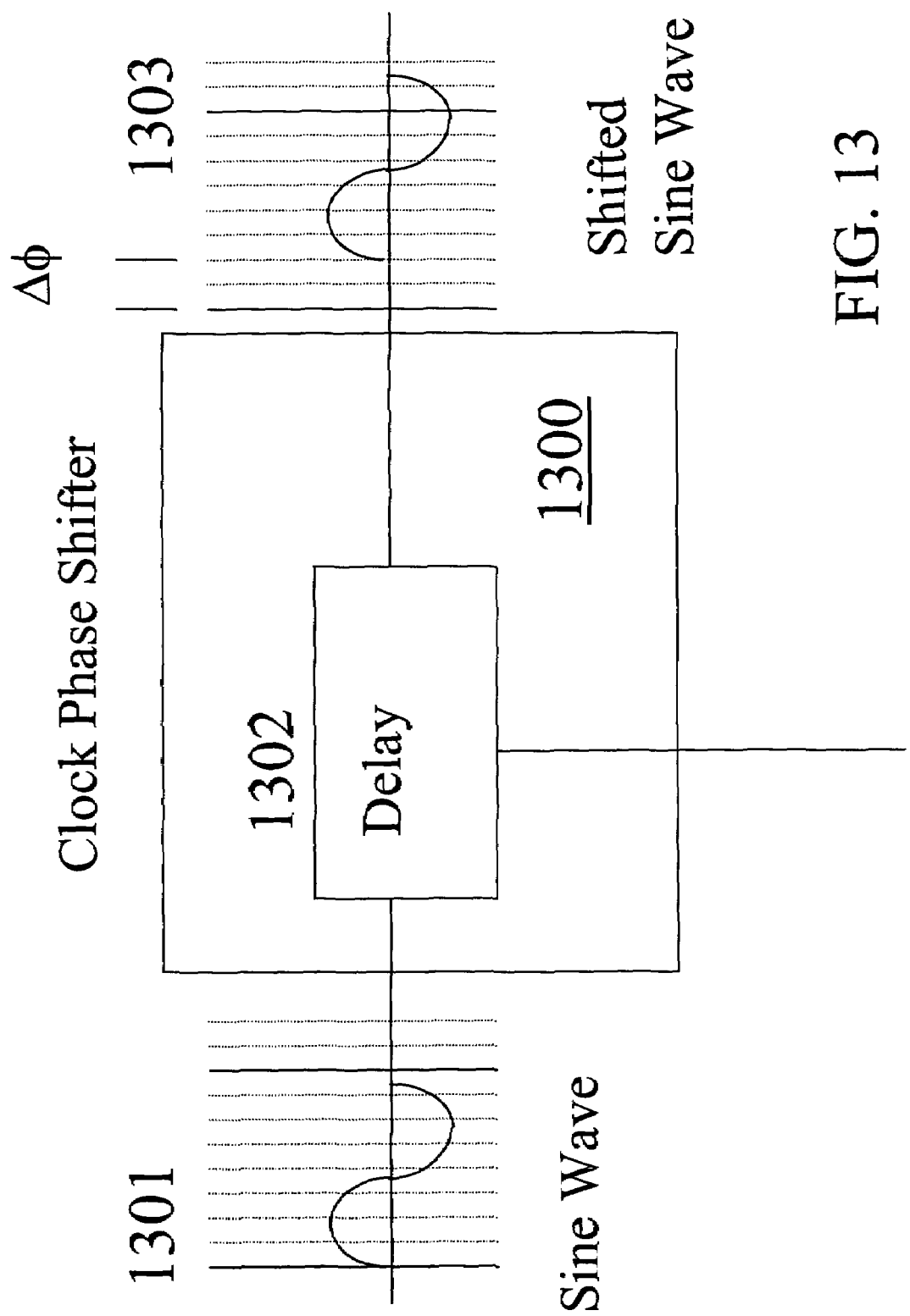
FIG. 13 illustrates the clock phase shifter according to one embodiment of the present invention.

FIG. 13 illustrates a clock phase shifter 1300 according to one embodiment of the present invention. A sine wave signal 1301, such as the master time clock timing pulse, is input into a delay 1302. Alternatively, the sine wave may be generated by, for example, a local oscillator, or any other suitable component. In one embodiment, the delay 1302 imparts a fixed delay to the sine wave 1301. Alternatively, as shown, a controllable delay may be used. In this embodiment, a phase shift control signal may be used to set the appropriate phase delay of the delay 1302. An output is a shifted sine wave 1303. The output sine wave has been shifted by an amount ΔΦ corresponding to the phase shift imparted by the delay 1302.

Figure 14:
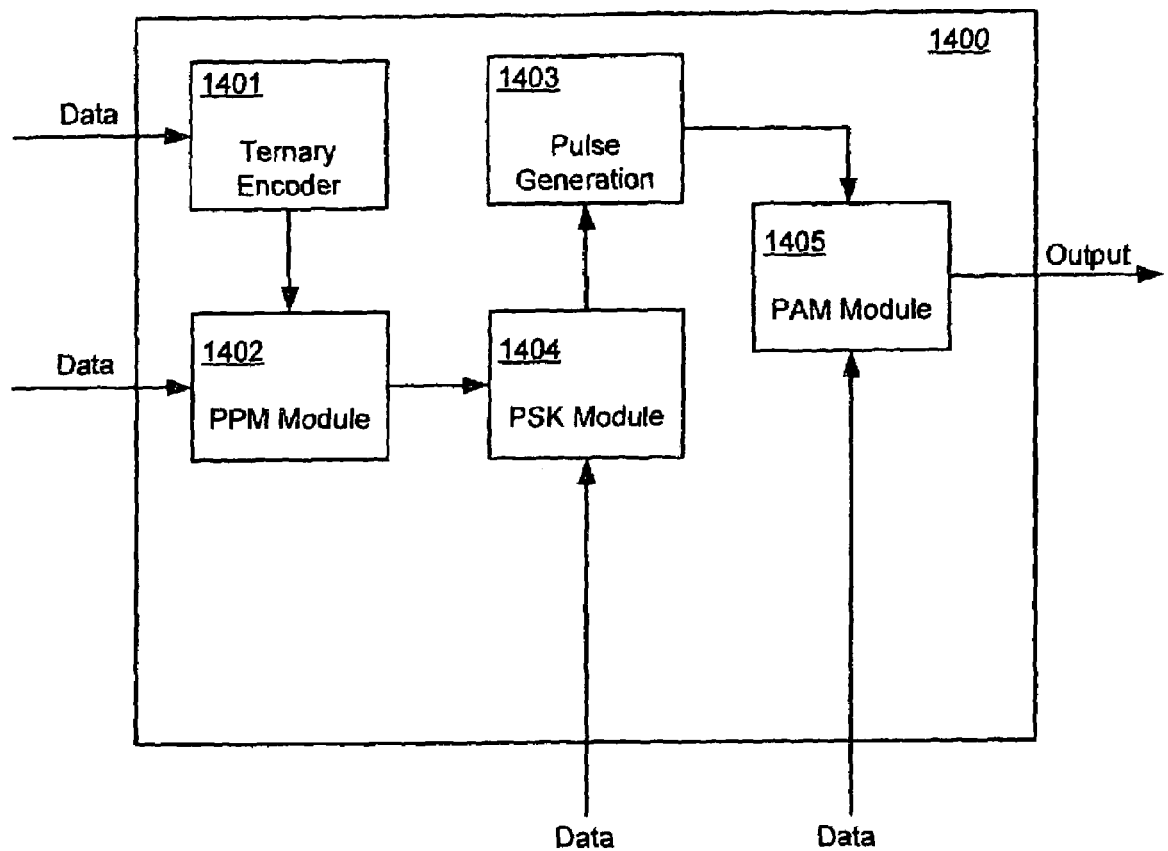
FIG. 14 illustrates multi-level modulation using ternary encoding, phase shift keying and amplitude modulation according to one embodiment of the present invention.

FIG. 14 illustrates an ultra-wideband (UWB) transmitter system 1400 according to one embodiment of the present invention. In this embodiment, data is encoded into unique data groups by a ternary encoder 1401. The unique data groups are further modulated in position by additional data by a PPM module 1402. The position modulated data groups are further modulated in phase by a PSK module 1404. The modulated data is then sent to a pulse generation module 1403. The pulse generation module 1403 generates a plurality of monocycle pulses by methods described above. The plurality of monocycle pulses may then be further modulated in amplitude by additional data by a PAM module 1405 prior to output. In other embodiments, some of the modulation modules may be in reverse order, or in any desired order, or they may be omitted from the transmitter system 1400.

Figure 15:
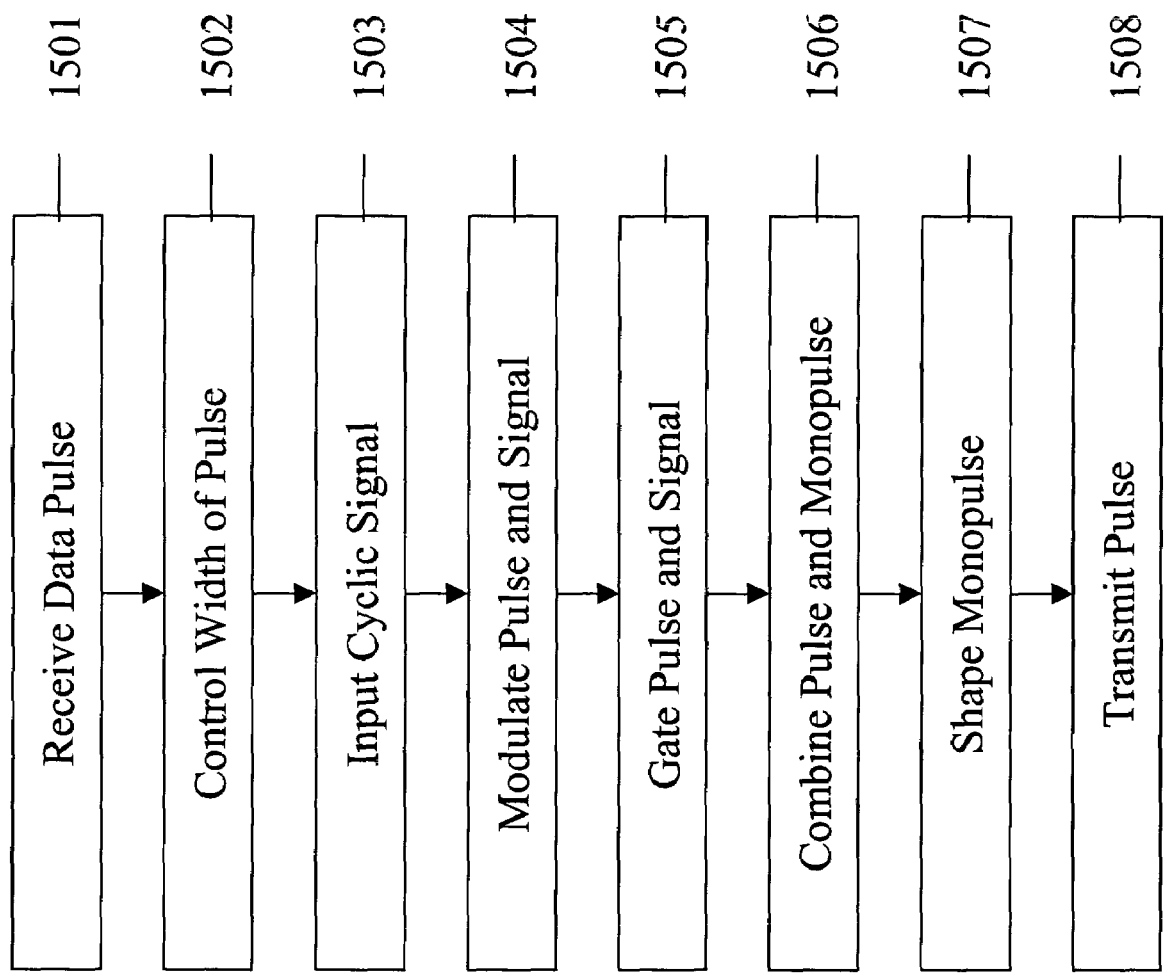
FIG. 15 illustrates a method for transmitting ultra-wideband pulses according to one embodiment of the invention.

FIG. 15 illustrates a method for transmitting UWB pulses according to one embodiment of the invention. Data to be transmitted may be received by a transmitter, in step 1501. The data is preferably in a digital form (e.g., in the form of a plurality data pulses). The data received, however, may be received in analog form and be converted to digital form using a known analog-to-digital converter. A width of the data pulses may be controlled using a data width shaper, in step 1502. A cyclic signal, such as a sine wave, may be input into the transmitter, in step 1503. The sine wave may be input using, for example, a local oscillator. The data pulses and the sine wave may be modulated in step 1504. The modulation may include, for example, phase shifting the data pulses and the sine wave.

The data pulses and the sine wave may be transmitted to a switch, for example, a gate, for gating the data pulses and the sine wave, in step 1505. Preferably, the gate permits only a one-half cycle of the sine wave (a monopulse) in addition to the data pulses to pass through the gate. The gate may be activated by a leading edge and a trailing edge of the data pulse. The monopulse and the data pulses (provided that there is more than one monopulse) may be combined using a combiner, in step 1506. The monopulse may be shaped by, preferably, a bandpass filter into a monocycle, in step 1507. Using a phase shift control signal, the data pulses may be transmitted, in step 1508.

Figure 16:
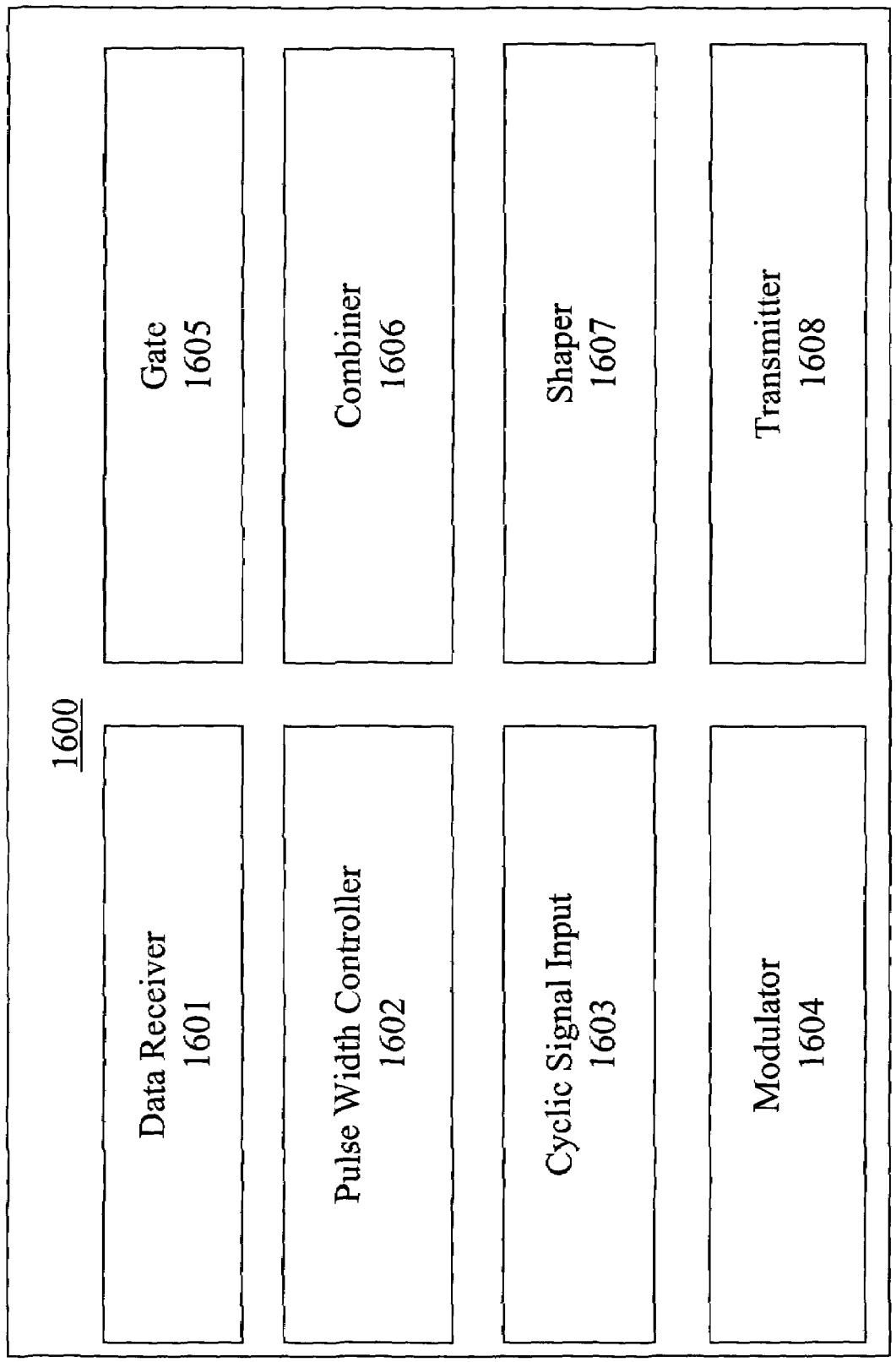
FIG. 16 illustrates a system for transmitting ultra-wideband pulses according to one embodiment of the invention.

FIG. 16 illustrates a system 1600 for transmitting UWB signals according to one embodiment of the invention. The system 1600 may include a data receiver 1601. The data receiver may receive data in either digital or analog form. If the data is received in analog form, the data may be converted into digital form (e.g., pulses) using an analog-to-digital converter. A pulse width controller 1602 may be used to control a width of the data pulses. A cyclic signal input 1603 may then be used to input a cyclic signal, for example, a sine wave, into the system 1600. The cyclic signal input may be, for example, a local oscillator. A modulator 1604 may be used to modulate the data pulses and the sine wave. The modulator 1604 may modulate the data pulse and sine wave by, for example, varying a phase, amplitude or other characteristic of the data pulses and sine wave.

The data pulses and the sine wave may be transmitted to a switch such as, for example, a logic gate 1605. The logic gate 1605 may be used to gate the data pulses and the sine wave. Preferably, the gate 1605 permits only one-half of the sine wave (a monopulse) in addition to the data pulses to pass therethrough. The gate 1605 may be activated by a leading edge and a trailing edge of the data pulse. The monopulse and the data pulses may be combined using, for example, a combiner 1606. The monopulse may be shaped into a monocycle by a filter such as, for example, a bandpass filter in shaper step 1607. A phase shift control signal may be used to transmit the data pulse using, for example, transmitter 1608.

One or more modulation techniques may be used to carry out the invention. Modulation techniques may be used to transmit data using a single symbol, or pulse, to represent a plurality of binary digits, or bits. This has an advantage of increasing the data rate in a communications system. A few examples of modulation include Pulse Width Modulation (PWM), Pulse Amplitude Modulation (PAM), and Pulse Position Modulation (PPM). In PWM, a series of predefined widths are used to represent different sets of bits. For example, in a system employing 8 different pulse widths, each symbol could represent one of 8 combinations. This symbol would carry 3 bits of information. In PAM, predefined amplitudes are used to represent different sets of bits. A system employing PAM16 would have 16 predefined amplitudes. This system would be able to carry 4 bits of information per symbol. In a PPM system, predefined positions within the pulse timeslot are used to carry a set of bits. A system employing PPM16 would be capable of carrying 4 bits of information per symbol. Communications systems typically employ more than one modulation technique. This has the potential of vastly increasing the data rate of a communications system.

Another type of modulation method is phase modulation (PM). PM is common in carrier-based communications. Two forms of phase modulation include binary phase shift keying (BPSK) and quadrature phase shift keying (QPSK). In BPSK, the phase of a carrier wave can take two values (0 and 180). A 180-degree phase shift in the carrier could signal a change in the data value. Because BPSK systems use two states (0 and 180 degrees) to modulate data onto the carrier, the system is capable of carrying one bit in each time period. In contrast, QPSK systems modulate data onto the carrier by shifting the phase of the carrier in 90-degree increments. QPSK systems are therefore capable of 2 bits of information during the same time period.

Figure 18:
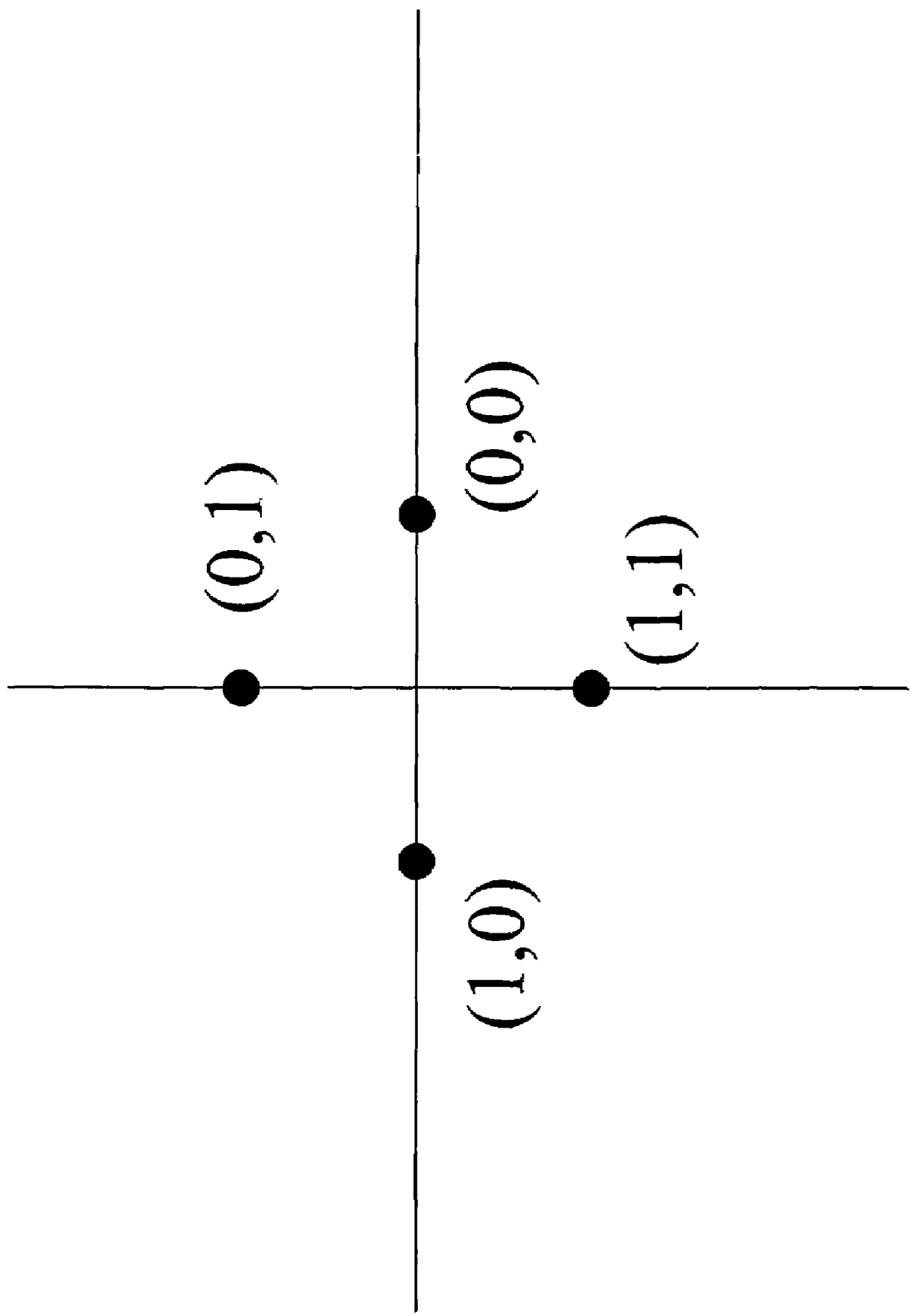
FIG. 18 illustrates a constellation of Quadrature Phase Shift Keying (QPSK)
Figure 19:
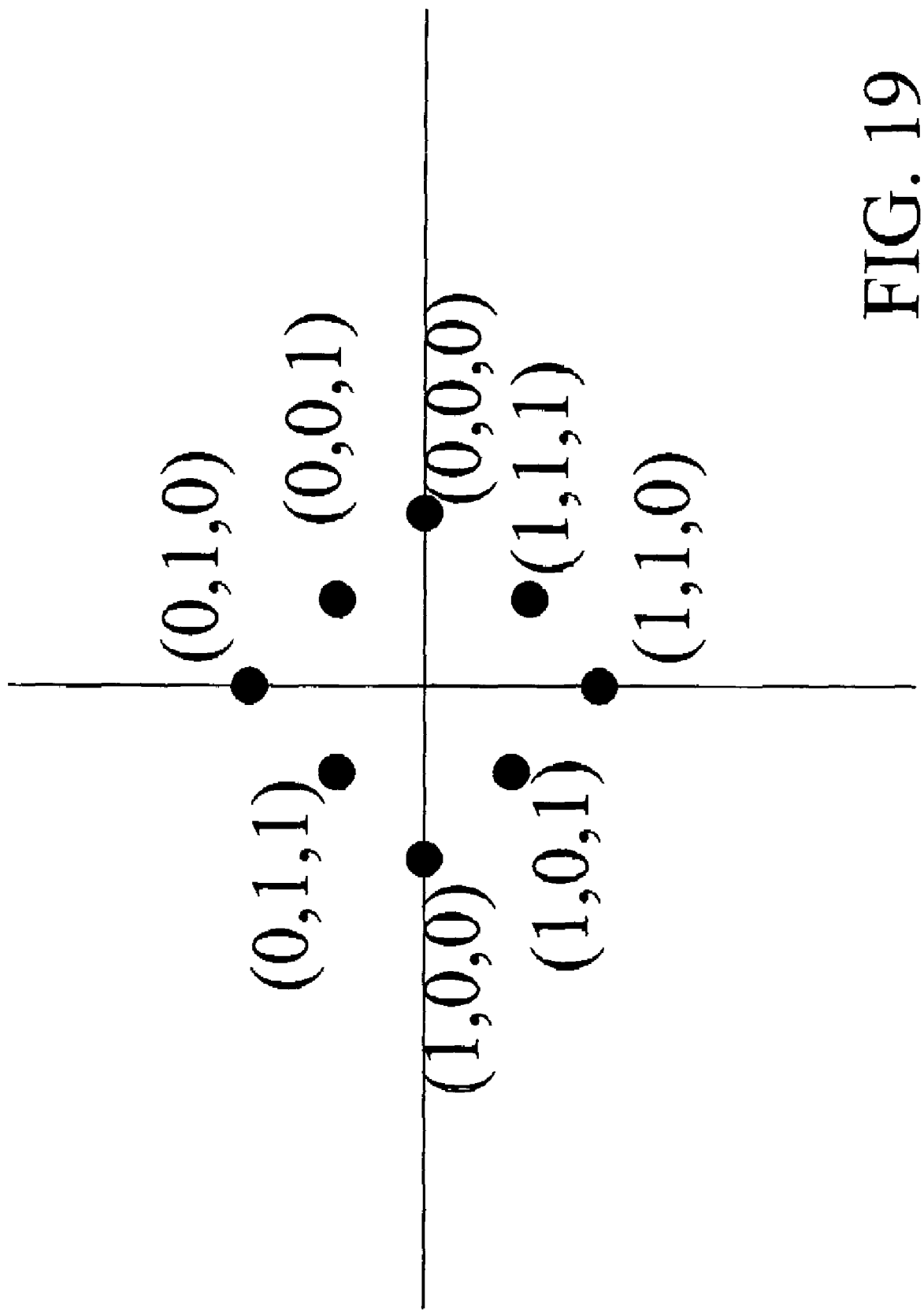
FIG. 19 illustrates a constellation of 8 level Phase Shift Keying (PSK)
Figure 20:
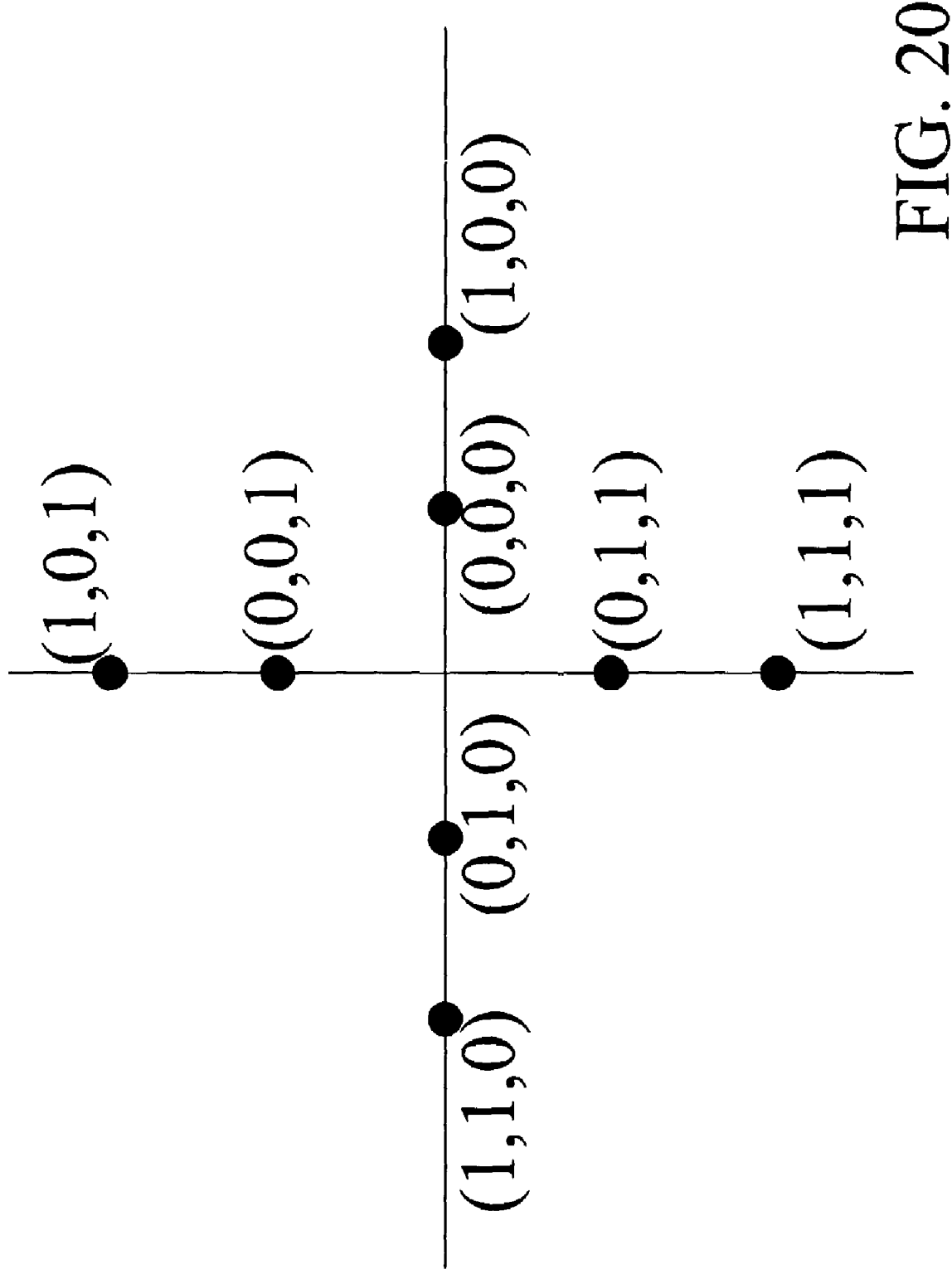
FIG. 20 illustrates a constellation of 16 level Quadrature Amplitude Modulation (QAM)

FIGS. 18, 19, and 20 illustrate examples of data modulation employing different Quadrature Amplitude Modulation (QAM) constellations, or arrangements, according to one embodiment of the present invention. FIG. 18 shows a single amplitude level assignment in Quadrature Phase Shift Keying (QPSK). Because four phase angles are used in QPSK, a single ultra-wideband pulse is able to carry 2 bits of information.

FIG. 19 shows an eight-level single amplitude constellation capable of 3 bits of information per ultra-wideband (UWB) pulse. This embodiment is an eight level PSK system where data assignments are made based on phase increments of 45 degrees. Alternatively, FIG. 19 also shows a two-amplitude level QPSK system wherein one bit of information is carried on the amplitude and two bits on the phase of the UWB pulse.

Alternative embodiments of this type of modulation may employ M-ary QAM arrangements, and these constellations may be extended to encompass higher-level (in both amplitude and phase) QAM systems.

In another modulation method employed by the present invention, data is initially modulated employing a ternary modulation method as described in pending Unites States patent application, titled: ULTRA-WIDEBAND PULSE MODULATION SYSTEM AND METHOD, Ser. No. 10/425,936, filed Apr. 28, 2003, which in incorporated herein by reference in its entirety. Generally, the ternary modulation method modulates two data bits onto one of four distinct data groups. The data groups consist of 0,1; 0,-1; -1,0; and 1,0.

Because ternary encoding uses unique data groups where one time period within the data group is always a zero, conventional Pulse Position Modulation (PPM) becomes problematic. In conventional PPM, each time slot may be assigned a different data value. If this modulation method is used with ternary encoded data groups, the presence of intentional energy within a time bin interval within the PPM allotted slots may be interpreted as one of two unique data groups.

For example, if in time slot 5 of 16 time slots available to a PPM modulated system there is intentional energy representing a -1, the two possibilities are 0, -1 beginning in slot 4, or -1, 0 beginning in slot 5. Ternary encoding thus requires modification to conventional PPM in that time bins are grouped to correspond to the size of the unique data group.

Figure 17:
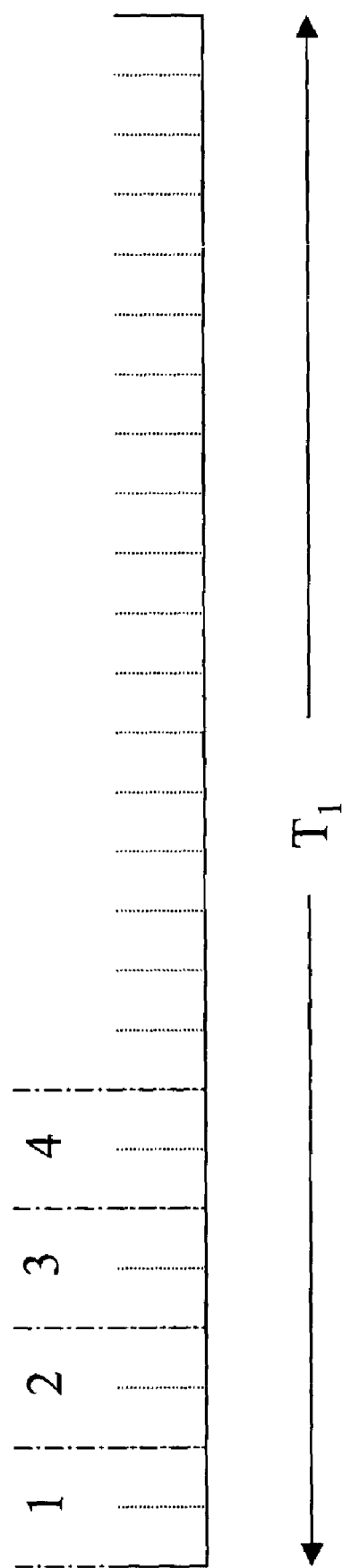
FIG. 17 illustrates the use of Pulse Position Modulation (PPM) with slots for unique data groups according to one embodiment of the invention.

FIG. 17 illustrates the use of PPM with slots for unique data groups according to one embodiment of the present invention. The first 8 time slots of N-available slots of a pulse transmission frame $T_1$ are allocated to four positions for ternary encoded, or modulated data groups. In this manner, the above-mentioned ambiguity is avoided.

For illustrative convenience, FIG. 17 shows an ultra-wideband pulse transmission frame $T_1$ that has 26 time slots, with time slots 1–8 partitioned into four time bins 1–4. It will be appreciated that the number of time slots and time bins may vary.

Referring again to FIG. 17, in one envisioned modulation scheme of the present invention, a PPM module further modulates ternary encoded data with additional data based on the placement of a data group within an ultra-wideband pulse transmission frame $T_1$. The time positions for PPM 4 are applied to one of the four ternary data groups. In this embodiment, a single ultra-wideband pulse represents 4 bits of information. That is, two bits of information determine which of the four ternary data groups is transmitted, and the other 2 bits determines which of the four positions (from PPM modulation) the data group occupies.

The data rate of a ultra-wideband communication system employing a transmitter constructed according to the present invention may be calculated by the inverse of the pulse transmission frame $T_1$ duration times the number of bits per ultra-wideband pulse. If the pulse transmission frame $T_1$ shown in FIG. 17 is 10 nano-seconds, the overall data rate of this transmitter system is 700 Mbps.

The addition of Amplitude Modulation (AM) to multi-level PSK systems is commonly referred to as Quadrature Amplitude Modulation (QAM). QAM has an added advantage of encoding information into variations of amplitude. In FIG. 20, there are two distinct amplitudes and four phases used to carry information. This system would allow 3 bits of information to be encoded during each time period.

In another embodiment of the present invention, the transmitter system may also employ a phase modulation unit. In this embodiment, additional data is further encoded by employing additional phases to the data group. For example, by adding eight phases, the previous four unique data groups (described above in connection with FIG. 17) become 16 unique data groups: 0, $\phi_1$; 0, $\phi_2$; 0, $\phi_3$; 0, $\phi_4$; 0, $-\phi_1$; 0, $-\phi_2$; 0, $-\phi_3$; 0, $-\phi_4$; $\phi_1$, 0; $\phi_2$, 0; $\phi_3$, 0; $\phi_4$, 0; $-\phi_1$, 0; $-\phi_2$, 0; $-\phi_3$, 0; $-\phi_4$, 0. With 16 unique data groups, one intentional pulse of energy represents four bits of information.

In a further embodiment, the transmitter system may employ a PAM module. In this embodiment, additional data is encoded on the amplitude of the data group. For example, in a transmitter system employing four amplitudes, one additional bit of information may be encoded onto the data group. In this embodiment, there are 8 unique data groups: 0, A1; 0, -A1; 0, A2; 0 -A2; A1, 0; A2, 0; -A1, 0; and -A2, 0. The unique data groups then carry three bits of information on a single pulse of intentional energy.

In a further embodiment, a PPM module, a PSK module, and a PAM module may be employed to encode additional data onto the unique data groups. With the addition of PPM-4, PAM-2, and PSK-8, in each of the available PPM slots, there would be 32 possible data groups. This system results in 128 total combinations of unique data groups. In this embodiment, a single intentional pulse of energy carries 7 bits of information.

One feature of the present invention is its improved multi-path immunity over conventional PPM modulated UWB systems. Multi-path interference can pose a significant problem in wireless communications systems. Multi-path is the result of portions of a transmitted signal arriving at an intended receiver through different propagation paths. The multi-path components may be delayed in time due to their increased path length. A wireless receiver must be able to discriminate between intended signals and signals that arrive due to this multi-path effect. Because the receiver need only pay attention to signals that arrive in a small number of predetermined time bins, multi-path components arriving at other times may be ignored. For example, given 25 time bins in a pulse transmission frame $T_1$, using PPM 16 would require the receiver to accurately discriminate intended pulses from multi-path signals in 16 of the 25 time bins. In contrast, one embodiment of the present invention may place a single pulse of energy in eight of the 26 time bins. Pulses arriving at the receiver in any of the remaining 18 time bins may be ignored.

Figure 21:
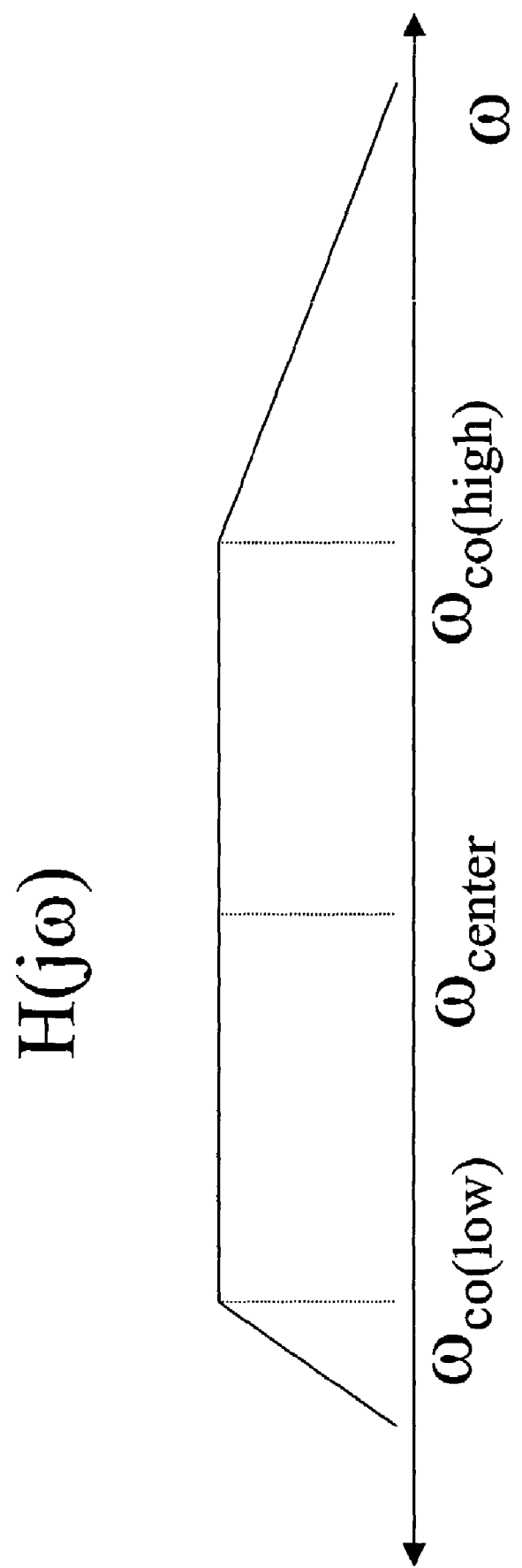
FIG. 21 illustrates the frequency response of an asymmetric bandpass filter constructed according to one embodiment of the present invention.

FIG. 21 illustrates the frequency response of an asymmetric bandpass filter. In various embodiments of the present invention, the filtering for shaping phase shifted monopulses into phase-shifted monocycles may include at least one asymmetric bandpass filter. The frequency response shown in FIG. 21 is asymmetric in the sense that frequencies below a low cutoff frequency $\omega_{co(low)}$ are attenuated at a different rate than frequencies above a high cutoff frequency $\omega_{co(high)}$.

Preferably, the bandpass filter attenuates frequencies below its low cutoff frequency by approximately 36 dBm per octave and above its high cutoff frequency by approximately 18 dB per octave, although other increments may be used. The bandpass filter also preferably has a bandwidth between approximately 100 mega-Hertz and 7.5 giga-Hertz, although other bandwidth ranges may be used. A center frequency for the bandpass filter preferably is between approximately 3.1 giga-Hertz to 10.6 giga-Hertz.

Thus, it is seen that an apparatus for generating, modulating, and transmitting electromagnetic pulses, such as ultra-wideband pulses, may be provided. One skilled in the art will appreciate that the present invention may be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. An ultra-wideband transmitter, comprising:
   a data modulation unit configured to generate a plurality of data groups representing digital data;
   a transmitter unit communicating with the data modulation unit, the transmitter unit configured to receive the plurality of data groups and generate a plurality of electromagnetic pulses; and
   an antenna coupled to the transmitter unit, the antenna configured to transmit the electromagnetic pulses;
   wherein the transmitter unit comprises:
   a local oscillator configured to output a waveform;
   a phase controller that controls a phase of the waveform;
   a switch operatively coupled to the local oscillator that gates the waveform; and
   at least one filter operatively coupled to the switch, wherein the filter is a bandpass filter, and wherein a frequency response of the bandpass filter attenuates frequencies below a low cutoff frequency by at least 36 dBm per octave.

2. The transmitter of claim 1, wherein a frequency response of the bandpass filter attenuates frequencies above a high cutoff frequency by about 18 dBm per octave.

3. The transmitter of claim 1, wherein a bandwidth of the bandpass filter is between about 100 mega-hertz and about 7.5 giga-hertz.

4. The transmitter of claim 1, wherein a center frequency of the bandpass filter may range between about 3.1 giga-hertz to about 10.6 giga-hertz.

* * * * *